(12) United States Patent
Yamada et al.

(10) Patent No.: US 9,401,529 B2
(45) Date of Patent: Jul. 26, 2016

(54) NONAQUEOUS ELECTROLYTIC SOLUTION AND BATTERY INCLUDING A HETEROPOLYACID AND/OR A HETEROPOLYACID COMPOUND

(75) Inventors: Ichiro Yamada, Fukushima (JP); Shunsuke Saito, Fukushima (JP); Haruo Watanabe, Kanagawa (JP); Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/032,948

(22) Filed: Feb. 23, 2011

(65) Prior Publication Data

US 2011/0274981 A1 Nov. 10, 2011

(30) Foreign Application Priority Data

Mar. 2, 2010 (JP) ................................ P2010-044809

(51) Int. Cl.
| | |
|---|---|
| *H01M 6/14* | (2006.01) |
| *H01M 10/0565* | (2010.01) |
| *H01M 4/13* | (2010.01) |
| *H01M 4/62* | (2006.01) |
| *H01M 10/052* | (2010.01) |
| *H01M 10/0567* | (2010.01) |

(52) U.S. Cl.
CPC ............ *H01M 10/0565* (2013.01); *H01M 4/13* (2013.01); *H01M 4/62* (2013.01); *H01M 10/052* (2013.01); *H01M 10/0567* (2013.01); Y02E 60/122 (2013.01)

(58) Field of Classification Search
CPC .......... H01M 10/052; H01M 10/0565; H01M 10/0567; H01M 4/13; H01M 4/62

USPC ........................................................ 429/303
See application file for complete search history.

(56) References Cited

U.S. PATENT DOCUMENTS

| | | | |
|---|---|---|---|
| 4,630,176 A | 12/1986 | Cuellar et al. | |
| 4,633,372 A | 12/1986 | Calahan et al. | |
| 5,501,922 A | 3/1996 | Li et al. | |
| 2004/0115516 A1* | 6/2004 | Miyake et al. | 429/42 |
| 2006/0159975 A1* | 7/2006 | Kim et al. | 429/33 |
| 2007/0178379 A1 | 8/2007 | Tamura et al. | |
| 2009/0111020 A1* | 4/2009 | Yamaguchi et al. | 429/207 |
| 2010/0119956 A1* | 5/2010 | Tokuda et al. | 429/338 |
| 2010/0323240 A1* | 12/2010 | Tsujioka et al. | 429/199 |

FOREIGN PATENT DOCUMENTS

| | | |
|---|---|---|
| CN | 101292389 | 10/2008 |
| CN | 101489994 A * | 7/2009 |
| CN | 101489994 | 8/2013 |
| EP | 2065339 A1 | 6/2009 |
| JP | 59060818 | 4/1984 |
| JP | 01-200572 | 8/1989 |

(Continued)

OTHER PUBLICATIONS

Japanese Office Action issued Oct. 1, 2013 in corresponding Japanese Patent Application No. 2010-044809.

(Continued)

*Primary Examiner* — Gary Harris
(74) *Attorney, Agent, or Firm* — K&L Gates LLP

(57) ABSTRACT

A nonaqueous electrolytic solution includes: a solvent, an electrolyte salt, a polyacid and/or a polyacid compound, and a monofluorophosphate and/or a difluorophosphate.

29 Claims, 10 Drawing Sheets

(56) References Cited

FOREIGN PATENT DOCUMENTS

| | | |
|---|---|---|
| JP | 3439085 | 3/1999 |
| JP | 2002507310 | 3/2002 |
| JP | 2002-289188 | 10/2002 |
| JP | 2004-031079 | 1/2004 |
| JP | 2004-214116 | 7/2004 |
| JP | 2005-123156 | 5/2005 |
| JP | 2006-86058 | 3/2006 |
| JP | 2006-202646 | 8/2006 |
| JP | 2007511873 | 5/2007 |
| JP | 2007-141830 | 6/2007 |
| JP | 2008222484 A * | 9/2008 |
| JP | 2009-032653 | 2/2009 |
| JP | 2009032653 A * | 2/2009 |
| JP | 2009107990 | 5/2009 |
| JP | 2009-158464 | 7/2009 |
| JP | 2009-252681 | 10/2009 |

OTHER PUBLICATIONS

European Search Report issued Jan. 25, 2012, for corresponding European Appln. No. 11154798.0.

Chinese Office Action issued May 27, 2014 in corresponding Chinese Patent Application No. 201110044035.1.

* cited by examiner

NONAQUEOUS ELECTROLYTIC SOLUTION AND BATTERY INCLUDING A HETEROPOLYACID AND/OR A HETEROPOLYACID COMPOUND

CROSS REFERENCES TO RELATED APPLICATIONS

The present application claims priority to Japanese Priority Patent Application JP 2010-044809 filed in the Japan Patent Office on Mar. 2, 2010, the entire contents of which is hereby incorporated by reference.

BACKGROUND

The present application relates to a nonaqueous electrolytic solution and to a battery. In more detail, the present application relates to a nonaqueous electrolytic solution containing an organic solvent and an electrolyte salt and to a battery using the same.

In recent years, portable electronic appliances such as a video camera, a mobile phone and a laptop personal computer have widely spread, and it is strongly demanded to realize downsizing, weight reduction and long life thereof. Following this, the development of batteries as a power source for portable electronic appliances, in particular, secondary batteries which are lightweight and from which a high energy density is obtainable is advanced.

Above all, secondary batteries utilizing intercalation and deintercalation of lithium for a charge/discharge reaction (so-called lithium ion secondary batteries) are largely expected because a high energy density is obtainable as compared with lead batteries and nickel-cadmium batteries.

Such a secondary battery is provided with an electrolytic solution containing a solvent and an electrolyte salt dissolved therein. As this solvent, mixed solvents obtained by mixing a high-dielectric constant solvent which is easy to solvate with the electrolyte salt (for example, ethylene carbonate, propylene carbonate, etc.) and a low-viscosity solvent with excellent ion conductivity (for example, diethyl carbonate, dimethyl carbonate, ethyl methyl carbonate, etc.) are widely used. Since characteristics of the lithium secondary battery are largely influenced by a nonaqueous electrolytic solution to be used, for the purpose of more enhancing the battery characteristics, there are proposed nonaqueous electrolytic solutions containing various compounds.

For example, as described in Patent Document 1 (JP-A-2006-86058), there is proposed a method in which by adding a halogenated cyclic carbonate such as fluoroethylene carbonate or a cyclic carbonate having a carbon-carbon multiple bond such as vinylene carbonate to an electrolytic solution, a coating is formed on a negative electrode surface, and a reaction of a negative electrode active material with the electrolytic solution, or the like is suppressed, thereby improving a charge/discharge efficiency. Also, as described in Patent Document 2 (JP-A-2007-141830), there is proposed a method in which by incorporating a difluorophosphate which is a kind of an electrolyte salt together with the previously described reactive cyclic carbonate, even when a small amount of vinylene carbonate is incorporated, a cycle characteristic is enhanced, thereby enabling it to make compatible with a good low-temperature characteristic.

SUMMARY

However, though the reactive cyclic carbonate is able to form a firm electrode coating, it increases the resistance of the electrode surface, so that there was involved such a problem that the battery characteristics are not sufficient with respect to a discharge capacity especially at the time of large-current discharge or in the case of repetition of charge/discharge. Also, since a coating derived from an organic material such as a cyclic carbonate is not sufficient in heat stability, it was difficult to obtain sufficient battery characteristics because of a cause of the gas generation due to decomposition by an increase of the battery temperature at the time of discharge or the like.

Thus, it is desirable to provide a nonaqueous electrolytic solution and a battery, in which not only an increase of resistance following a charge/discharge cycle is suppressed, but battery characteristics at the time of large-current discharge are improved.

According to one embodiment, there is provided a nonaqueous electrolytic solution including a solvent, an electrolyte salt, a polyacid and/or a polyacid compound, and a monofluorophosphate and/or a difluorophosphate.

According to another embodiment, there is provided a battery including a positive electrode, a negative electrode and a nonaqueous electrolytic solution, wherein the nonaqueous electrolytic solution includes a solvent, an electrolyte salt, a heteropolyacid and/or a heteropolyacid compound, and a monofluorophosphate and/or a difluorophosphate.

According to still another embodiment, there is provided a nonaqueous electrolyte battery including a positive electrode, a negative electrode and a nonaqueous electrolytic solution containing a solvent and an electrolyte salt, wherein a coating in a gel form containing a compound derived from a monofluorophosphate and/or a difluorophosphate, and an amorphous polyacid and/or polyacid compound having one or more kinds of a polyelement is formed on the negative electrode.

In the foregoing one and still another embodiment, by adding the polyacid and/or the polyacid compound in the nonaqueous electrolytic solution, this compound which is able to intercalate and deintercalate a lithium ion forms a coating which is called a stable SEI (solid electrolyte interface coating) is formed on the negative electrode by charge/discharge at the initial stage of use, thereby suppressing decomposition of the solvent and the electrolyte salt in the nonaqueous electrolytic solution. The SEI containing the polyacid and/or the polyacid compound is inorganic and firm and is simultaneously small in resistance on the occasion of intercalating and deintercalating a lithium ion, and therefore, it may be considered that deterioration of the capacity or the like is hardly caused. Furthermore, it may be considered that when the monofluorophosphate and/or the difluorophosphate which is closed in the component to the lithium salt or the like in the electrolytic solution is added together with the polyacid and/or the polyacid compound, decomposition of the main electrolyte salt is more suppressed, whereby the SEI with a low resistance can be formed.

According to the embodiments of the present application, not only an increase of resistance following a charge/discharge cycle can be suppressed, but battery characteristics at the time of large-current discharge can be improved.

Additional features and advantages are described herein, and will be apparent from the following Detailed Description and the figures.

DETAILED DESCRIPTION

Figure 1:
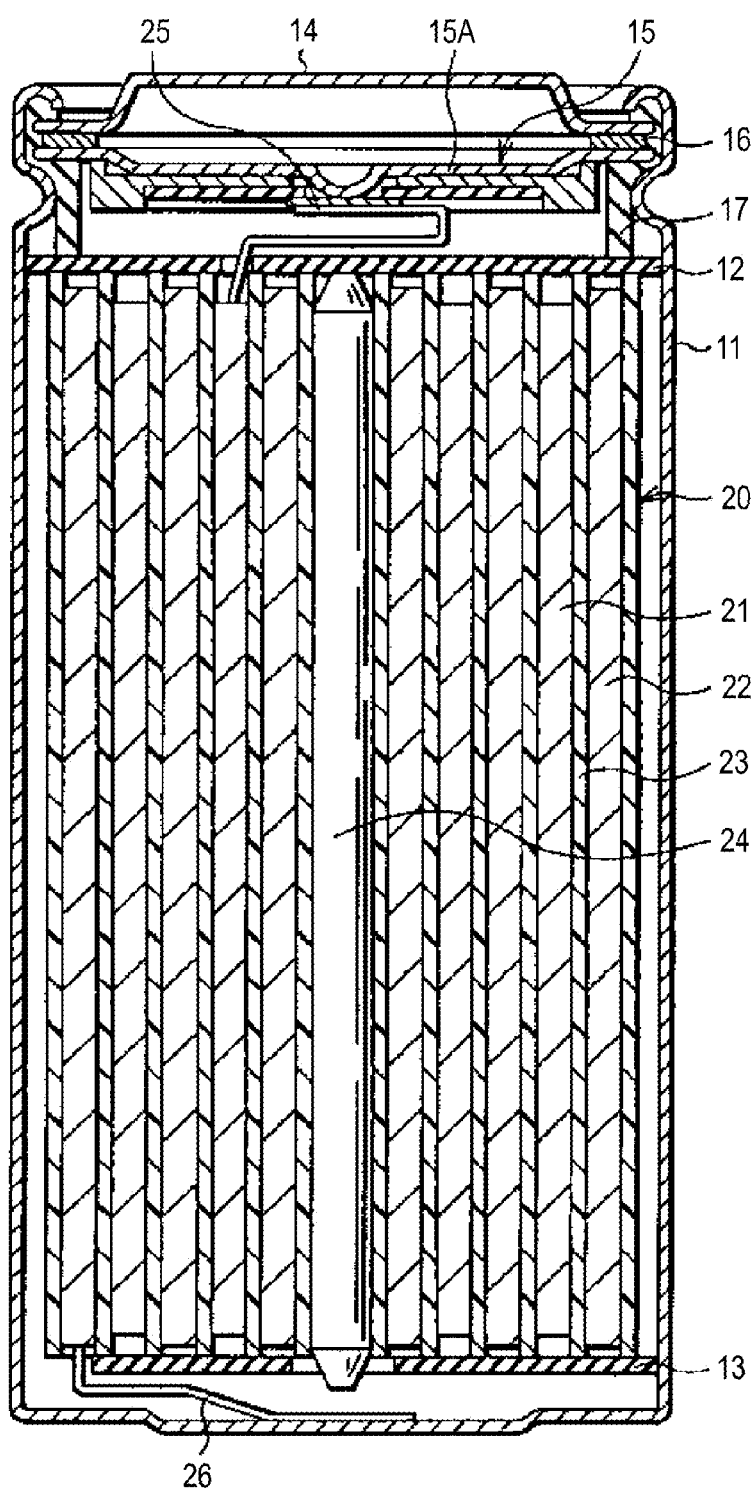
FIG. 1 is a sectional view showing a configuration example of a nonaqueous electrolyte battery according to an embodiment.

Embodiments of the present application will be described below in detail with reference to the drawings.

1. First embodiment (an electrolytic solution)
2. Second embodiment (a first example of a nonaqueous electrolyte battery)
3. Third embodiment (a second example of a nonaqueous electrolyte battery)
4. Fourth embodiment (a third example of a nonaqueous electrolyte battery)
5. Fifth embodiment (a fourth example of a nonaqueous electrolyte battery)
6. Sixth embodiment (a fifth example of a nonaqueous electrolyte battery)
7. Other embodiments (modification examples)
1. First Embodiment
(Electrolytic Solution)

An electrolytic solution according to a first embodiment is described. This electrolytic solution according to the first embodiment is, for example, one which is used for electrochemical devices such as batteries. The electrolytic solution contains a solvent, an electrolyte salt and, as additives, a polyacid and/or a polyacid compound and a monofluorophosphate and/or a difluorophosphate. The electrolyte salt, the polyacid and/or the polyacid compound and the monofluorophosphate and/or the difluorophosphate are dissolved in the solvent.

(Solvent)

Examples of the solvent which can be used include ethylene carbonate (EC), propylene carbonate (PC), butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate and dimethyl sulfoxide. This is because in the case of using this electrolytic solution for electrochemical devices such as batteries, excellent capacity, cycle characteristic and storage characteristic are obtainable. These materials may be used singly or in admixture of plural kinds thereof.

Above all, it is preferable to use one containing, as the solvent, at least one member selected from the group consisting of ethylene carbonate, propylene carbonate, dimethyl carbonate, diethyl carbonate and ethyl methyl carbonate. This is because sufficient effects are obtainable. In that case, in particular, it is preferable to use one containing a mixture of ethylene carbonate or propylene carbonate, each of which is a high viscosity (high dielectric constant) solvent (for example, specific dielectric constant $\epsilon \geq 30$), and dimethyl carbonate, diethyl carbonate or ethyl methyl carbonate, each of which is a low viscosity solvent (for example, viscosity $\leq 1$ mPa·s). This is because dissociation properties of the electrolyte salt and mobility of ions are enhanced, so that higher effects are obtainable.

(Electrolyte Salt)

The electrolyte salt may, for example, contain one or two or more kinds of a light metal salt such as a lithium salt. Examples of this lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl) and lithium bromide (LiBr). Above all, at least one member selected from the group consisting of lithium hexafluorophosphate, lithium tetrafluoroborate, lithium perchlorate and lithium hexafluoroarsenate is preferable, and lithium hexafluorophosphate is more preferable. This is because the resistance of the nonaqueous electrolyte is lowered. In particular, it is preferable to use lithium tetrafluoroborate together with lithium hexafluorophosphate.

It is preferable that this electrolytic solution contains at least one member of compounds selected from the group consisting of unsaturated cyclic carbonates and halogenated cyclic carbonates. This is because the chemical stability of the electrolytic solution is more enhanced.

Examples of the unsaturated cyclic carbonate include vinylene carbonate based compounds, vinyl ethylene carbonate based compounds and methylene ethylene based carbonate based compounds. Examples of the vinylene carbonate based compound include vinylene carbonate, methyl vinylene carbonate, ethyl vinylene carbonate, 4,5-dimethyl-1,3-dioxol-2-one and 4,5-diethyl-1,3-dioxol-2-one; examples of the vinyl ethylene carbonate based compound include vinyl ethylene carbonate, 4-methyl-4-vinyl-1,3-dioxolan-2-one, 4-ethyl-4-vinyl-1,3-dioxolan-2-one, 5-methyl-4-vinyl-1,3-dioxolan-2-one and 4,5-divinyl-1,3-dioxolan-2-one; and examples of the methylene ethylene carbonate based compound include 4-methylene-1,3-dioxolan-2-one and 4,4-dimethyl-5-methylene-1,3-dioxolan-2-one. These materials may be used singly or in admixture of plural kinds thereof.

Examples of the halogenated cyclic carbonate include 4-fluoro-1,3-dioxolan-2-one, 4-chloro-1,3-dioxolan-2-one, 4,5-difluoro-1,3-dioxolan-2-one, tetrafluoro-1,3-dioxolan-2-one, 4-chloro-5-fluoro-1,3-dioxolan-2-one, 4,5-dichloro-1,3-dioxolan-2-one, tetrachloro-1,3-dioxolan-2-one, 4,5-bis-trifluoromethyl-1,3-dioxolan-2-one, 4-trifluoromethyl-1,3-dioxolan-2-one, 4,5-difluoro-4,5-dimethyl-1,3-dioxolan-2-one, 4,4-difluoro-5-methyl-1,3-dioxolan-2-one, 4-ethyl-5,5- difluoro-1,3-dioxolan-2-one, 4-fluoro-5-trifluoromethyl-1,3-dioxolan-2-one, 4-methyl-5-trifluoromethyl-1,3-dioxolan-2-one, 4-fluoro-4,5-dimethyl-1,3-dioxolan-2-one, 5-(1,1-difluoroethyl)-4,4-difluoro-1,3-dioxolan-2-one, 4,5-dichloro-4,5-dimethyl-1,3-dioxolan-2-one, 4-ethyl-5-fluoro-1,3-dioxolan-2-one, 4-ethyl-4,5-difluoro-1,3-dioxolan-2-one, 4-ethyl-4, 5,5-trifluoro-1,3-dioxolan-2-one and 4-fluoro-4-methyl-1,3-dioxolan-2-one. These materials may be used singly or in admixture of plural kinds thereof.

For example, a material obtained by mixing an unsaturated cyclic carbonate and/or a cyclic carbonate together with a saturated cyclic carbonate such as ethylene carbonate and a chain carbonate such as dimethyl carbonate is used. At that time, a content of the saturated cyclic carbonate is, for example, 5% by mass or more and not more than 50% by mass. A content of the chain carbonate is, for example, 30% by mass or more and not more than 80% by mass. A content of the unsaturated cyclic carbonate and/or the cyclic carbonate is, for example, 0.01% by mass or more and not more than 30% by mass.

(Additives)
(Polyacid and/or Polyacid Compound)
(Heteropolyacid and/or Heteropolyacid Compound)

The heteropolyacid is a condensate of two or more kinds of an oxoacid. It is preferable that this heteropolyacid or heteropolyacid compound has a structure in which a heteropolyacid ion thereof is easily soluble in the solvent of the battery, such as a Keggin structure, an Anderson structure and a Dawson structure.

The heteropolyacid and/or the heteropolyacid compound is, for example, one having a polyatom selected from the following element group (a); or one having a polyatom selected from the following element group (a), in which a part of the polyatoms is substituted with at least any one element selected from the following element group (b).

Element group (a): Mo, W, Nb, V
Element group (b): Ti, Cr, Mn, Fe, Co, Ni, Cu, Zn, Ga, Zr, Tc, Rh, Cd, In, Sn, Ta, Re, Tl, Pb Also, the heteropolyacid and/or the heteropolyacid compound is, for example, one having a hetero atom selected from the following element group (c); or one having a hetero atom selected from the following element group (c), in which a part of the hetero atoms is substituted with at least any one element selected from the following element group (d).

Element group (c): B, Al, Si, P, Cr, Mn, Fe, Co, Ni, Cu, Zn, Ge, As
Element group (d): H, Be, B, C, Na, Al, Si, P, S, Ti, V, Cr, Mn, Fe, Co, Ni, Cu, Zn, Ga, Ge, As, Se, Zr, Rh, Sn, Sb, Te, I, Re, Pt, Bi, Ce, Th, U, Np More specifically, for example, a compound represented by the following formula (I) is exemplified as the heteropolyacid and/or the heteropolyacid compound. This compound represented by the formula (I) is one in which a heteropolyacid ion thereof takes a Keggin structure and is preferable because it is easily soluble in the electrolytic solution.

$$A_x[BD_{12}O_{40}] \cdot yH_2O \tag{1}$$

In the formula (I), A represents Li, Na, K, Rb, Cs, Mg, Ca, Al, NH$_4$, a quaternary ammonium salt or a phosphonium salt; B represents P, Si, As or Ge; D represents at least one element selected from the group consisting of Ti, V, Cr, Mn, Fe, Co, Ni, Cu, Zn, Ga, Zr, Nb, Mo, Tc, Rh, Cd, In, Sn, Ta, W, Re and Tl; and x and y are values falling within the ranges of ($0 \leq x \leq 7$) and ($0 \leq y \leq 50$), respectively.

More specifically, examples of the heteropolyacid which is used in the first embodiment according to the present application include heteropolytungstic acids such as phosphotungstic acid and silicotungstic acid; and heteropolymolybdic acids such as phosphomolybdic acid and silicomolybdic acid. Examples of the heteropolyacid compound include heteropolytungstic acid compounds such as sodium silicotungstate, sodium phosphotungstate and ammonium phosphotungstate. Also, examples of the heteropolyacid compound include heteropolymolybdic acid compounds such as sodium phosphomolybdate and ammonium phosphomolybdate. Such a heteropolyacid or heteropolyacid compound may be used in admixture of two or more kinds thereof. Such a heteropolyacid or heteropolyacid compound is easily soluble in the solvent, is stable in the battery and is hard to give adverse influences such as a reaction with other material. Also, examples of the heteropolyacid and/or the heteropolyacid compound containing plural kinds of polyelements include phosphovanadomolybdic acid, phosphotungstomolybdic acid, silicovanadomolybdic acid and silicotungstomolybdic acid. It is preferable that the heteropolyacid compound has a cation, for example, Li$^+$, Na$^+$, K$^+$, R$^{b+}$, Cs$^+$, R$_4$N$^+$, R$_4$P$^+$, etc., wherein R is H or a hydrocarbon group having not more than 10 carbon atoms. Also, the cation is more preferably Li$^+$, tetra-n-butylammonium or tetra-n-butylphosphonium. Examples of such a heteropolyacid compound include heteropolytungstic acid compounds such as sodium silicotungstate, sodium phosphotungstate, ammonium phosphotungstate and a silicotungstic acid tetra-tetra-n-butylphosphonium salt. Also, examples of the heteropolyacid compound include heteropolymolybdic acid compounds such as sodium phosphomolybdate, ammonium phosphomolybdate and a phosphomolybdic acid tri-tetra-n-butylammonium salt. Furthermore, examples of a compound containing plural polyacids include materials such as a phosphotungstomolybdic acid tri-tetra-n-ammonium salt. Such a heteropolyacid or heteropolyacid compound may be used in admixture of two or more kinds thereof. Such a heteropolyacid or heteropolyacid compound is easily soluble in the solvent, is stable in the battery and is hard to give adverse influences such as a reaction with other material.

Examples of the polyacid and/or the polyacid compound include, in addition to the foregoing heteropolyacids and/or the heteropolyacid compounds, polyacids and/or polyacid compounds not having a hetero atom and having one or two or more kinds of a polyatom, such as an isopolyacid and/or an isopolyacid compound having one kind of a polyatom; and a polyacid and/or a polyacid compound having two or more kinds of a polyatom and not having a hetero atom.

Examples of such a polyacid and/or polyacid compound include one not having a hetero atom and having a polyatom selected from the following element group (a); and one having a polyatom selected from the following element group (a), in which a part of the polyatoms is substituted with at least any one element selected from the following element group (b).

Element group (a): Mo, W, Nb, V
Element group (b): Ti, Cr, Mn, Fe, Co, Ni, Cu, Zn, Ga, Zr, Tc, Rh, Cd, In, Sn, Ta, Re, Tl, Pb More specifically, examples thereof include tungstic(VI) acid and molybdic(VI) acid. Specific examples thereof include tungstic anhydride, molybdic anhydride and hydrates thereof. Examples of the hydrate which can be used include orthotungstic acid (H$_2$WO$_4$) which is tungstic acid monohydrate (WO$_3 \cdot$H$_2$O), molybdic acid dihydrate (H$_4$MoO$_5$, H$_2$MoO$_4 \cdot$H$_2$O or MoO$_3 \cdot$2H$_2$O) and orthomolybdic acid (H$_2$MoO$_4$) which is molybdic acid monohydrate (MoO$_3 \cdot$H$_2$O). Also, tungstic anhydride (WO$_3$) having a smaller hydrogen content than metatungstic acid, paratungstic acid and the like which are an isopolyacid of the foregoing hydrate, and ultimately having a zero hydrogen content;

molybdic anhydride ($MoO_3$) having a smaller hydrogen content than metamolybdic acid, paramolybdic acid and the like, and ultimately having a zero hydrogen content; and the like can be used.

It is preferable to use the heteropolyacid and/or the heteropolyacid compound as the polyacid and/or the polyacid compound in view of the fact that it exhibits a high solubility in a solvent to be used at the time of preparing a positive electrode mixture or a negative electrode mixture; a nonaqueous solvent to be used for the electrolyte; or the like. Also, the hetero atom-free polyacid and/or polyacid compound tends to be slightly deteriorated in an effect per addition weight as compared with the heteropolyacid and/or the heteropolyacid compound. However, since the hetero atom-free polyacid and/or polyacid compound is low in solubility in a polar solvent, when applied to a positive electrode or a negative electrode, the hetero atom-free polyacid and/or polyacid compound has excellent aspects in coating characteristics such as viscoelasticity and its change with time, so that it has usefulness from the industrial viewpoint.

(Content)

A content of the polyacid and/or the polyacid compound is preferably 0.01% by mass or more and not more than 3% by mass, and more preferably 0.05% by mass or more and not more than 1% by mass relative to the electrolytic solution. When the content of the polyacid and/or the polyacid compound is too small, the formation of SEI is insufficient, so that it may be impossible to protect the electrode. Also, what the content of the polyacid and/or the polyacid compound is too large is not preferable because an irreversible capacity by the reaction becomes excessively large, so that the battery capacity is lowered. The mass of the polyacid is defined to be a value obtained by subtracting the mass of bound water which the polyacid has. Also, similarly, the mass of the polyacid compound is defined to be a value obtained by subtracting the mass of bound water which the polyacid compound has.

(Monofluorophosphate and Difluorophosphate)

The nonaqueous electrolytic solution contains at least one member selected from the group consisting of a monofluorophosphate composed of a monofluorophosphoric acid anion and a cation and a difluorophosphate composed of a difluorophosphoric acid anion and a cation.

Though the cation constituting the monofluorophosphate or difluorophosphate is not particularly limited, examples thereof include an alkali metal ion of Li, Na, K, etc.; an alkaline earth metal ion of Mg, Ca, etc.; other metal element ions; an ammonium cation; and a phosphonium cation. Above all, from the standpoint of battery characteristics when used for a lithium ion secondary battery, a lithium cation, a magnesium cation or an ammonium cation is preferable.

(Content)

A content of the monofluorophosphate and/or the difluorophosphate in the nonaqueous electrolytic solution is preferably 10 ppm or more and not more than 5,000 ppm, and more preferably 10 ppm or more and not more than 500 ppm. In the case where the nonaqueous electrolytic solution does not contain the monofluorophosphate and/or the difluorophosphate, when the nonaqueous electrolytic solution contains only the heteropolyacid compound, the effect against an increase in resistance or high-temperature stability is insufficient. Also, what the content of the monofluorophosphate and/or the difluorophosphate in the nonaqueous electrolytic solution is too large is not preferable because the conductivity or charge/discharge efficiency of the electrolytic solution is lowered. The term "ppm" is one expressed on the basis of a mass of the electrolytic solution.

The polyacid and/or the polyacid compound, and the monofluorophosphate and/or the difluorophosphate may be added by other method than a method of mixing the respective compounds with the solvent to be used for the electrolytic solution. For example, when this electrolytic solution is used for electrochemical devices such as batteries, the polyacid and/or the polyacid compound, and the monofluorophosphate and/or the difluorophosphate may be incorporated into the electrolytic solution by mixing the compounds as raw materials in a nonaqueous solvent or electrolyte active material. Examples of the raw material of the polyacid and/or the polyacid compound include tungsten oxide and molybdenum oxide; and examples of the raw material of the monofluorophosphate and/or the difluorophosphate include lithium hexafluorophosphate and salts thereof.

Also, when this electrolytic solution is used for electrochemical devices, the polyacid and/or the polyacid compound may be added to the electrolytic solution by adding the polyacid and/or the polyacid compound to other battery constituent element than the electrolytic solution.

For example, in the case of adding the polyacid and/or the polyacid compound to a positive electrode, when the electrolytic solution is impregnated in the positive electrode, the polyacid and/or the polyacid compound added to the positive electrode elutes into the electrolytic solution. According to this, the polyacid and/or the polyacid compound can be added to the electrolytic solution.

Also, for example, in the case of adding the polyacid and/or the polyacid compound to a negative electrode, when the electrolytic solution is impregnated in the negative electrode, the polyacid and/or the polyacid compound added to the negative electrode elutes into the electrolytic solution. According to this, the polyacid and/or the polyacid compound can be added to the electrolytic solution.

Also, for example, in the case of adding the polyacid and/or the polyacid compound to a separator, when the electrolytic solution is impregnated in the separator, the polyacid and/or the polyacid compound added to the separator elutes into the electrolytic solution. According to this, the polyacid and/or the polyacid compound can be added to the electrolytic solution.

<Effect>

In the first embodiment according to the present application, the polyacid and/or the polyacid compound, and the monofluorophosphate and/or the difluorophosphate are incorporated into the electrolytic solution. According to this, for example, when used for electrochemical devices such as batteries, not only an increase of resistance following a charge/discharge cycle is suppressed, but even when the battery temperature increases at the time of high-temperature use or at the time of large-current discharge or the like, a side reaction between the electrode active material and the electrolytic solution is suppressed, so that the battery characteristics are improved.

2. Second Embodiment (Configuration of Nonaqueous Electrolyte Battery)

Figure 2:
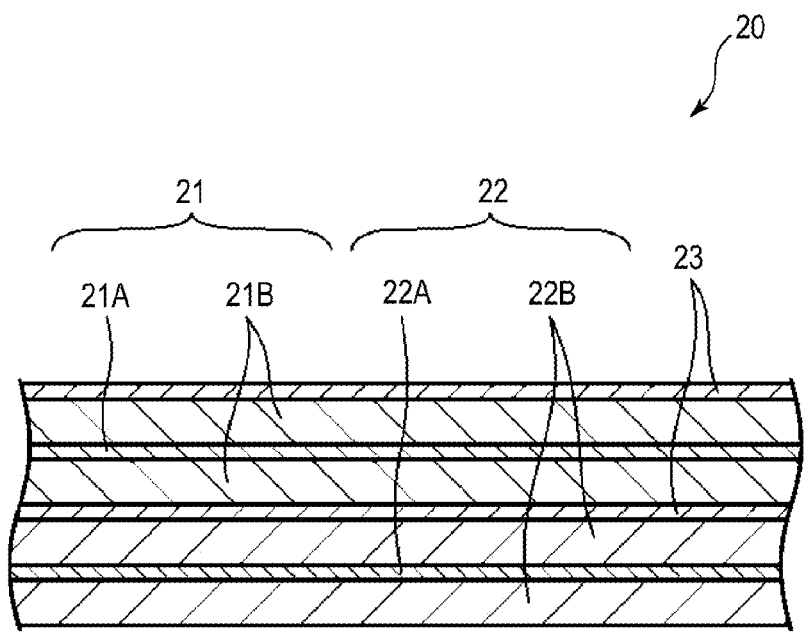
FIG. 2 is a sectional view showing enlargedly a part of a wound electrode body in FIG. 1.

A nonaqueous electrolyte battery according to a second embodiment is described. FIG. 1 shows a sectional configuration of the nonaqueous electrolyte battery according to the second embodiment. FIG. 2 shows enlargedly a part of a wound electrode body 20 shown in FIG. 1. This nonaqueous electrolyte battery is, for example, a lithium ion secondary battery in which a capacity of a negative electrode is expressed on the basis of intercalation and deintercalation of lithium as an electrode reactant.

In this nonaqueous electrolyte battery, a wound electrode body 20 in which a positive electrode 21 and a negative electrode 22 are laminated via a separator 23 and wound and a pair of insulating plates 12 and 13 are housed mainly in the inside of a substantially hollow columnar battery can 11. A battery structure using this columnar battery can 11 is called a cylindrical type.

The battery can 11 is constituted of, for example, iron (Fe) plated with nickel (Ni), and one end thereof is closed, with the other end being opened. In the inside of the battery can 11, a pair of the insulating plates 12 and 13 is respectively disposed vertical to the winding peripheral face so as to interpose the wound electrode body 20 therebetween.

In the open end of the battery can 11, a battery lid 14 is installed by caulking with a safety valve mechanism 15 and a positive temperature coefficient device (PTC device) 16 provided in the inside of this battery lid 14 via a gasket 17, and the inside of the battery can 11 is hermetically sealed.

The battery lid 14 is, for example, constituted of the same material as that in the battery can 11. The safety valve mechanism 15 is electrically connected to the battery lid 14 via the positive temperature coefficient device 16. In this safety valve mechanism 15, when the internal pressure of the battery reaches a fixed value or more due to an internal short circuit or heating from the outside or the like, a disc plate 15A is reversed, whereby electrical connection between the battery lid 14 and the wound electrode body 20 is disconnected.

When the temperature rises, the positive temperature coefficient device 16 controls the current by an increase of the resistance value, thereby preventing abnormal heat generation to be caused due to a large current. The gasket 17 is, for example, constituted of an insulating material, and asphalt is coated on the surface thereof.

For example, a center pin 24 is inserted in the center of the wound electrode body 20. In the wound electrode body 20, a positive electrode lead 25 made of aluminum (Al) or the like is connected to the positive electrode 21; and a negative electrode lead 26 made of nickel (Ni) or the like is connected to the negative electrode 22. The positive electrode lead 25 is electrically connected to the battery lid 14 by means of welding to the safety valve mechanism 15; and the negative electrode lead 26 is electrically connected to the battery can 11 by means of welding.

(Positive Electrode)

The positive electrode 21 is, for example, one in which a positive electrode active material layer 21B is provided on the both surfaces of a positive electrode collector 21A having a pair of surfaces opposing to each other. However, the positive electrode active material layer 21B may be provided on only one surface of the positive electrode collector 21A.

The positive electrode collector 21A is, for example, constituted of a metal material such as aluminum, nickel and stainless steel.

The positive electrode active material layer 21B contains, as a positive electrode active material, one or two or more kinds of a positive electrode material capable of intercalating and deintercalating lithium and may further contain other material such as a binder and a conductive agent, if desired.

(Positive Electrode Material)

As the positive electrode material capable of intercalating and deintercalating lithium, for example, a lithium-containing compound is preferable. This is because a high energy density is obtainable. Examples of this lithium-containing compound include a complex oxide containing lithium and a transition metal element and a phosphate compound containing lithium and a transition metal element. Of these, a compound containing at least one member selected from the group consisting of cobalt, nickel, manganese and iron as the transition metal element is preferable. This is because a higher voltage is obtainable.

Examples of the complex oxide containing lithium and a transition metal element include a lithium cobalt complex oxide ($Li_xCoO_2$), a lithium nickel complex oxide ($Li_xNiO_2$), a lithium nickel cobalt complex oxide ($Li_xNi_{1-z}Co_zO_2$ (z<1)), a lithium nickel cobalt manganese complex oxide ($Li_xNi_{(1-v-w)}Co_vMn_wO_2$ ((v+w)<1)), and a lithium manganese complex oxide ($LiMn_2O_4$) or a lithium manganese nickel complex oxide ($LiMn_{2-t}Ni_tO_4$ (t<2)) each having a spinel type structure. Of these, cobalt-containing complex oxides are preferable. This is because not only a high capacity is obtainable, but an excellent cycle characteristic is obtainable. Also, examples of the phosphate compound containing lithium and a transition metal element include a lithium iron phosphate compound (LiFePO4), a lithium iron manganese phosphate compound ($LiFe_{1-u}Mn_uPO_4$ (u<1)) and $Li_xFe_{1-y}M2_yPO_4$ (wherein M2 represents at least one member selected from the group consisting of manganese (Mn), nickel (Ni), cobalt (Co), zinc (Zn) and magnesium (Mg); and x is a value falling with the range of (0.9≤x≤1.1)).

Moreover, from the viewpoint that higher electrode filling properties and cycle characteristic are obtainable, the positive electrode material capable of intercalating and deintercalating lithium may be formed as a complex particle obtained by coating the surface of a core particle composed of any one of the foregoing lithium-containing compounds by a fine particle composed of any one of other lithium-containing compounds.

Besides, examples of the positive electrode material capable of intercalating and deintercalating lithium include oxides such as titanium oxide, vanadium oxide and manganese dioxide; disulfides such as titanium disulfide and molybdenum sulfide; chalcogenides such as niobium selenide; sulfur; and conductive polymers such as polyaniline and polythiophene. As a matter of course, the positive electrode material capable of intercalating and deintercalating lithium may be other material than those described above. Also, the above-exemplified series of positive electrode materials may be a mixture of two or more kinds thereof in an arbitrary combination.

(Negative Electrode)

The negative electrode 22 is, for example, one in which a negative electrode active material layer 22B is provided on the both surfaces of a negative electrode collector 22A having a pair of surfaces opposing to each other. However, the negative electrode active material layer 22B may be provided on only one surface of the negative electrode collector 22A.

The negative electrode collector 22A is, for example, constituted of a metal material such as copper, nickel and stainless steel.

The negative electrode active material layer 22B contains, as a negative electrode active material, one or two or more kinds of a negative electrode material capable of intercalating and deintercalating lithium and may further contain other material such as a binder and a conductive agent, if desired. On that occasion, it is preferable that a rechargeable capacity on the negative electrode material capable of intercalating and deintercalating lithium is larger than a discharge capacity of the positive electrode. Details regarding the binder and the conductive agent are the same as those in the positive electrode.

Examples of the negative electrode material capable of intercalating and deintercalating lithium include carbon materials. Examples of such a carbon material include easily graphitized carbon, hardly graphitized carbon with a (002)

plane interval of 0.37 nm or more and graphite with a (002) plane interval of not more than 0.34 nm. More specifically, there are exemplified pyrolytic carbons, cokes, vitreous carbon fibers, organic polymer compound baked materials, active carbon and carbon blacks. Of these, examples of the cokes include pitch coke, needle coke and petroleum coke. The organic polymer compound baked material as referred to herein is a material obtained through carbonization by baking a phenol resin, a furan resin or the like at an appropriate temperature. The carbon material is preferable because a change in a crystal structure following the intercalation and deintercalation of lithium is very small, and therefore, a high energy density is obtainable, an excellent cycle characteristic is obtainable, and the carbon material also functions as a conductive agent. The shape of the carbon material may be any of a fibrous shape, a spherical shape, a granular shape or a flaky shape.

In addition to the foregoing carbon materials, examples of the negative electrode material capable of intercalating and deintercalating lithium include a material capable of intercalating and deintercalating lithium and containing, as a constituent element, at least one member selected from the group consisting of metal elements and semi-metal elements. This is because a high energy density is obtainable. Such a negative electrode material may be a simple substance, an alloy or a compound of a metal element or a semi-metal element, or may be one having one or two or more kinds of a phase in at least a part thereof. The "alloy" as referred to herein includes, in addition to alloys composed of two or more kinds of a metal element, alloys containing one or more kinds of a metal element and one or more kinds of a semi-metal element. Also, the "alloy" may contain a non-metal element. Examples of its texture include a solid solution, a eutectic (eutectic mixture), an intermetallic compound and one in which two or more kinds thereof coexist.

Examples of the metal element or semi-metal element include a metal element or a semi-metal element capable of forming an alloy together with lithium. Specific examples thereof include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd) and platinum (Pt). Of these, at least one member selected from silicon and tin is preferable, and silicon is more preferable. This is because silicon and tin have large capability to intercalate and deintercalate lithium, so that a high energy density is obtainable.

Examples of the negative electrode material containing at least one member selected from silicon and tin include a simple substance, an alloy or a compound of silicon; a simple substance, an alloy or a compound of tin; and one having one kind or two or more kinds of a phase in at least a part thereof.

Examples of alloys of silicon include alloys containing, as a second constituent element other than silicon, at least one member selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr). Examples of alloys of tin include alloys containing, as a second constituent element other than tin (Sn), at least one member selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr).

Examples of compounds of tin or compounds of silicon include compounds containing oxygen (O) or carbon (C), and these compounds may further contain the foregoing second constituent element in addition to tin (Sn) or silicon (Si).

As the negative electrode material containing at least one member selected from silicon (Si) and tin (Sn), for example, a material containing tin (Sn) as a first constituent element and in addition to this tin (Sn), a second constituent element and a third constituent element is especially preferable. As a matter of course, this negative electrode material may be used together with the foregoing negative electrode material. The second constituent element is at least one member selected from the group consisting of cobalt (Co), iron (Fe), magnesium (Mg), titanium (Ti), vanadium (V), chromium (Cr), manganese (Mn), nickel (Ni), copper (Cu), zinc (Zn), gallium (Ga), zirconium (Zr), niobium (Nb), molybdenum (Mo), silver (Ag), indium (In), cerium (Ce), hafnium (Hf), tantalum (Ta), tungsten (W), bismuth (Bi) and silicon (Si). The third constituent element is at least one member selected from the group consisting of boron (B), carbon (C), aluminum (Al) and phosphorus (P). This is because when the second constituent element and the third constituent element are contained, a cycle characteristic is enhanced.

Above all, the negative electrode material is preferably an SnCoC-containing material containing tin (Sn), cobalt (Co) and carbon (C) as constituent elements and having a content of carbon (C) in the range of 9.9% by mass or more and not more than 29.7% by mass and a proportion of cobalt (Co) to the total sum of tin (Sn) and cobalt (Co) (Co/(Sn+Co)) in the range of 30% by mass or more and not more than 70% by mass. This is because in the foregoing composition range, not only a high energy density is obtainable, but an excellent cycle characteristic is obtainable.

This SnCoC-containing material may further contain other constituent element, if desired. As other constituent element, for example, silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga) and bismuth (Bi) are preferable. The SnCoC-containing material may contain two or more kinds of these elements. This is because a capacity characteristic or a cycle characteristic is more enhanced.

The SnCoC-containing material has a phase containing tin (Sn), cobalt (Co) and carbon (C), and it is preferable that this phase has a lowly crystalline or amorphous structure. Also, in the SnCoC-containing material, it is preferable that at least a part of carbon as the constituent element is bound to a metal element or a semi-metal element as other constituent element. This is because though it may be considered that a lowering of the cycle characteristic is caused due to aggregation or crystallization of tin (Sn) or the like, when carbon is bound to other element, such aggregation or crystallization is suppressed.

Examples of a measurement method for examining the binding state of elements include X-ray photoelectron spectroscopy (XPS). In this XPS, so far as graphite is concerned, a peak of the 1s orbit (C1s) of carbon appears at 284.5 eV in an energy-calibrated apparatus such that a peak of the 4f orbit of a gold atom (Au4f) is obtained at 84.0 eV. Also, so far as surface contamination carbon is concerned, a peak of the 1s orbit (C1s) of carbon appears at 284.8 eV. On the contrary, when a charge density of the carbon element is high, for example, when carbon is bound to a metal element or a semi-metal element, the peak of C1s appears in a lower region than 284.5 eV. That is, when a peak of a combined wave of C1s obtained regarding the SnCoC-containing material appears in a lower region than 284.5 eV, at least a part of carbon (C) contained in the SnCoC-containing material is bound to a metal element or a semi-metal element as other constituent element.

In the XPS measurement, for example, the peak of C1s is used for correcting the energy axis of a spectrum. In general, since surface contamination carbon exists on the surface, the peak of C1s of the surface contamination carbon is fixed at 284.8 eV, and this peak is used as an energy reference. In the XPS measurement, since a waveform of the peak of C1s is obtained as a form including the peak of the surface contamination carbon and the peak of carbon in the SnCoC-containing material, the peak of the surface contamination carbon and the peak of the carbon in the SnCoC-containing material are separated from each other by means of analysis using, for example, a commercially available software program. In the analysis of the waveform, the position of a main peak existing on the lowest binding energy side is used as an energy reference (284.8 eV).

Also, examples of the negative electrode material capable of intercalating and deintercalating lithium include metal oxides and polymer compounds, each of which is capable of intercalating and deintercalating lithium. Examples of the metal oxide include iron oxide, ruthenium oxide and molybdenum oxide; and examples of the polymer compound include polyacetylene, polyaniline and polypyrrole.

The negative electrode material capable of intercalating and deintercalating lithium may be other material than those described above. Also, the above-exemplified negative electrode materials may be a mixture of two or more kinds thereof in an arbitrary combination.

The negative electrode active material layer 22B may be, for example, formed by any of a vapor phase method, a liquid phase method, a spraying method, a baking method or a coating method, or a combined method of two or more kinds of these methods. When the negative electrode active material layer 22B is formed by adopting a vapor phase method, a liquid phase method, a spraying method, a baking method or a combined method of two or more kinds of these methods, it is preferable that the negative electrode active material layer 22B and the negative electrode collector 22A are alloyed on at least a part of an interface therebetween. Specifically, it is preferable that on the interface, the constituent elements of the negative electrode collector 22A are diffused into the negative electrode active material layer 22B, the constituent elements of the negative electrode active material layer 22B are diffused into the negative electrode collector 22A, or these constituent elements are mutually diffused into each other. This is because not only breakage to be caused due to expansion and shrinkage of the negative electrode active material layer 22B following the charge/discharge can be suppressed, but electron conductivity between the negative electrode active material layer 22B and the negative electrode collector 22A can be enhanced.

Examples of the vapor phase method include a physical deposition method and a chemical deposition method, specifically a vacuum vapor deposition method, a sputtering method, an ion plating method, a laser abrasion method, a thermal chemical vapor deposition (CVD) method and a plasma chemical vapor deposition method. As the liquid phase method, known techniques such as electrolytic plating and electroless plating can be adopted. The baking method as referred to herein is, for example, a method in which after a granular negative electrode active material is mixed with a binder and the like, the mixture is dispersed in a solvent and coated, and the coated material is then heat treated at a higher temperature than a melting point of the binder or the like. As to the baking method, known techniques can be utilized, too, and examples thereof include an atmospheric baking method, a reaction baking method and a hot press baking method.

(Separator)

The separator 23 partitions the positive electrode 21 and the negative electrode 22 from each other and allows a lithium ion to pass therethrough while preventing a short circuit of the current to be caused due to the contact between the both electrodes. This separator 23 is constituted of, for example, a porous film made of a synthetic resin such as polytetrafluoroethylene, polypropylene and polyethylene; a porous film made of a ceramic; or the like, and a laminate of two or more kinds of these porous films may also be used. The separator 23 may be impregnated with the electrolytic solution according to the foregoing first embodiment.

(Manufacturing Method of Nonaqueous Electrolyte Battery)

The foregoing nonaqueous electrolyte battery can be manufactured in the following manner.

(Manufacture of Positive Electrode)

First of all, the positive electrode 21 is fabricated. For example, a positive electrode material, a binder and a conductive agent are mixed to form a positive electrode mixture, which is then dispersed in an organic solvent to form a positive electrode mixture slurry in a paste form. Subsequently, the positive electrode mixture slurry is uniformly coated on the both surfaces of the positive electrode collector 21A by a doctor blade or a bar coater or the like and then dried. Finally, the coating is subjected to compression molding by a roll press or the like while heating, if desired, thereby forming the positive electrode active material layer 21B. In that case, the compression molding may be repeatedly carried out plural times.

(Manufacture of Negative Electrode)

Next, the negative electrode 22 is fabricated. For example, a negative electrode material and a binder and optionally, a conductive agent are mixed to form a negative electrode mixture, which is then dispersed in an organic solvent to form a negative electrode mixture slurry in a paste form. Subsequently, the negative electrode mixture slurry is uniformly coated on the both surfaces of the negative electrode collector 22A by a doctor blade or a bar coater or the like and then dried. Finally, the coating is subjected to compression molding by a roll press or the like while heating, if desired, thereby forming the negative electrode active material layer 22B.

Next, the positive electrode lead 25 is installed in the positive electrode collector 21A by means of welding or the like, and the negative electrode lead 26 is also installed in the negative electrode collector 22A by means of welding or the like. Thereafter, the positive electrode 21 and the negative electrode 22 are wound via the separator 23; a tip end of the positive electrode lead 25 is welded to the safety valve mechanism 15; and a tip end of the negative electrode lead 26 is also welded to the battery can 11. Then, the wound positive electrode 21 and negative electrode 22 are interposed between a pair of the insulating plates 12 and 13 and housed in the inside of the battery can 11. After housing the positive electrode 21 and the negative electrode 22 in the inside of the battery can 11, the electrolytic solution according to the first embodiment is injected into the inside of the battery can 21 and impregnated in the separator 23. Thereafter, the battery lid 14, the safety valve mechanism 15 and the positive temperature coefficient device 16 are fixed to the open end of the battery can 11 upon being caulked via the gasket 17. There is thus completed the nonaqueous electrolyte battery shown in FIGS. 1 and 2.

In the nonaqueous electrolyte battery according to the second embodiment, an electrolytic solution containing the polyacid and/or the polyacid compound, and the monofluorophosphate and/or the difluorophosphate is used. In this nonaqueous electrolyte battery, a coating is formed on the negative electrode 22 by initial charge or preliminary charge. This coating is one derived from the polyacid and/or the polyacid compound, and the monofluorophosphate and/or the difluorophosphate. That is, in view of the fact that the electrolytic solution contains the polyacid salt and/or polyacid compound, this compound which is able to intercalate and deintercalate a lithium ion forms a stable SEI coating on the negative electrode by charge/discharge at the initial stage of use, thereby suppressing decomposition of the solvent and the electrolyte salt in the nonaqueous electrolytic solution. The SEI formed by the polyacid and/or the polyacid compound is inorganic and firm and is simultaneously small in resistance on the occasion of intercalating and deintercalating a lithium ion, and therefore, it may be considered that deterioration of the capacity or the like is hardly caused. Furthermore, it may be considered that when the monofluorophosphate and/or the difluorophosphate which is closed in the component to the lithium salt in the electrolytic solution is added together with the polyacid and/or the polyacid compound, decomposition of the main electrolyte salt is more suppressed, whereby the SEI with a low resistance can be formed.

Also, the polyacid and/or the polyacid compound in the electrolytic solution is electrolyzed by initial charge or preliminary charge depending upon an addition amount thereof, whereby a compound derived from the polyacid and/or the polyacid compound is deposited on the surface of the positive electrode 21 to form a coating.

Also, in view of the fact that the electrolytic solution having the polyacid and/or the polyacid compound dissolved therein is impregnated in the negative electrode active material layer 22B, a compound derived from the polyacid and/or the polyacid compound may be deposited within the negative electrode active material layer 22B by charge or preliminary charge. According to this, the compound derived from the polyacid and/or the polyacid compound may exist among negative electrode active material particles.

Also, in view of the fact that the electrolytic solution having the polyacid and/or the polyacid compound dissolved therein is impregnated in the positive electrode active material layer 21B, a compound derived from the polyacid and/or the polyacid compound may be deposited within the positive electrode active material layer 21B by charge or preliminary charge. According to this, the compound derived from the polyacid and/or the polyacid compound may exist among positive electrode active material particles.

The deposited compound which is derived from the polyacid and/or the polyacid compound includes a polyacid and/or a polyacid compound having one or more kinds of a polyatom, or a reduced material of a polyacid and/or a polyacid compound having one or more kinds of a polyatom, each of which is produced by electrolysis of the polyacid and/or the polyacid compound and which is poorer in solubility than the polyacid and/or the polyacid compound before the electrolysis, or the like.

Specifically, the polyacid and/or the polyacid compound deposited on the surface of the negative electrode 34 is amorphous. For example, this amorphous polyacid and/or polyacid compound absorbs the nonaqueous electrolyte and exists as the coating in a gel form of the negative electrode 34 on the negative electrode surface. For example, a deposit containing the polyacid and/or the polyacid compound, which is deposited on the negative electrode 34, grows in a three-dimensional network structure and deposits at the time of preliminary charge or at the time of charge. Also, at least a part of the deposited polyacid and/or polyacid compound may be reduced.

Figure 3:
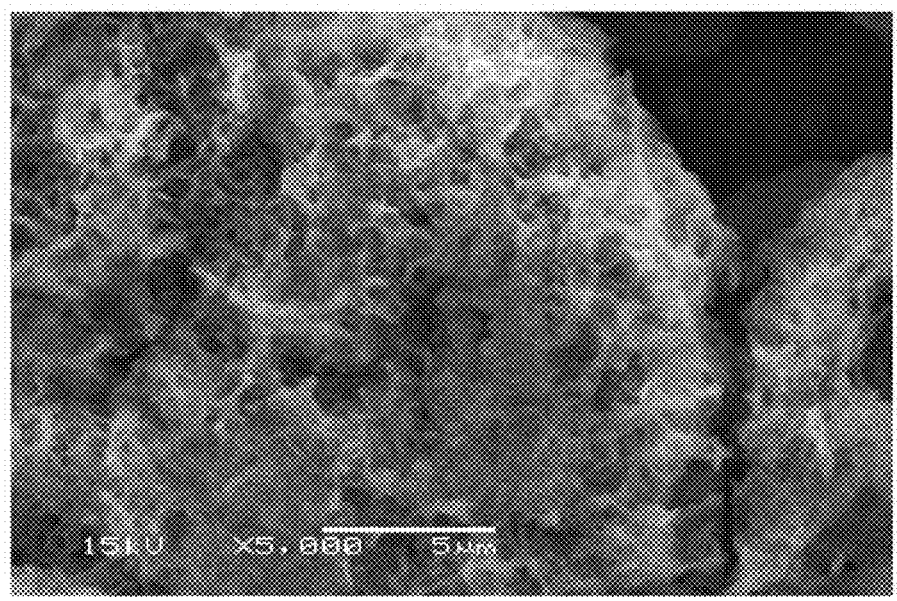
FIG. 3 is an SEM photograph of a negative electrode surface after charge.

The presence or absence of the coating derived from the polyacid and/or the polyacid compound can be confirmed by disassembling the nonaqueous electrolyte battery after charge or preliminary charge and taking out the positive electrode. For example, when a composition of the deposit deposited on the collector is confirmed, and the polyacid and/or the polyacid compound produced by electrolysis is deposited, it can be easily supposed that the polyacid and/or the polyacid compound is also similarly deposited on the active material layer, and it can be confirmed that the coating derived from the polyacid and/or the polyacid compound is formed. An SEM (scanning electron microscope) image of the coating in a gel form formed on the negative electrode surface, which contains the amorphous polyacid and/or polyacid compound containing one or more kinds of a polyelement, is shown in FIG. 3. FIG. 3 is an SEM image of the negative electrode surface after charge and is a photograph taken after washing the electrolytic solution and then drying.

The presence or absence of the deposited polyacid and/or polyacid compound can be, for example, confirmed by the X-ray photoelectron spectroscopy (XPS) analysis or time-of-flight secondary ion mass spectrometry (ToF-SIMS). In that case, the battery is disassembled, followed by washing with dimethyl carbonate. This is made for the purpose of removing a solvent component with low volatility and an electrolyte salt existing on the surface. It is desirable that sampling is carried out in an inert atmosphere if it is at all possible.

<Effect>

In the second embodiment according to the present application, the polyacid and/or the polyacid compound, and the monofluorophosphate and/or the difluorophosphate are incorporated into the electrolytic solution. According to this, for example, not only an increase of resistance following a charge/discharge cycle is suppressed, but even when the battery temperature increases at the time of high-temperature use or at the time of large-current discharge or the like, a side reaction between the electrode active material and the electrolytic solution is suppressed, so that the battery characteristics are improved.

3. Third Embodiment (Configuration of Nonaqueous Electrolyte Battery)

Figure 4:
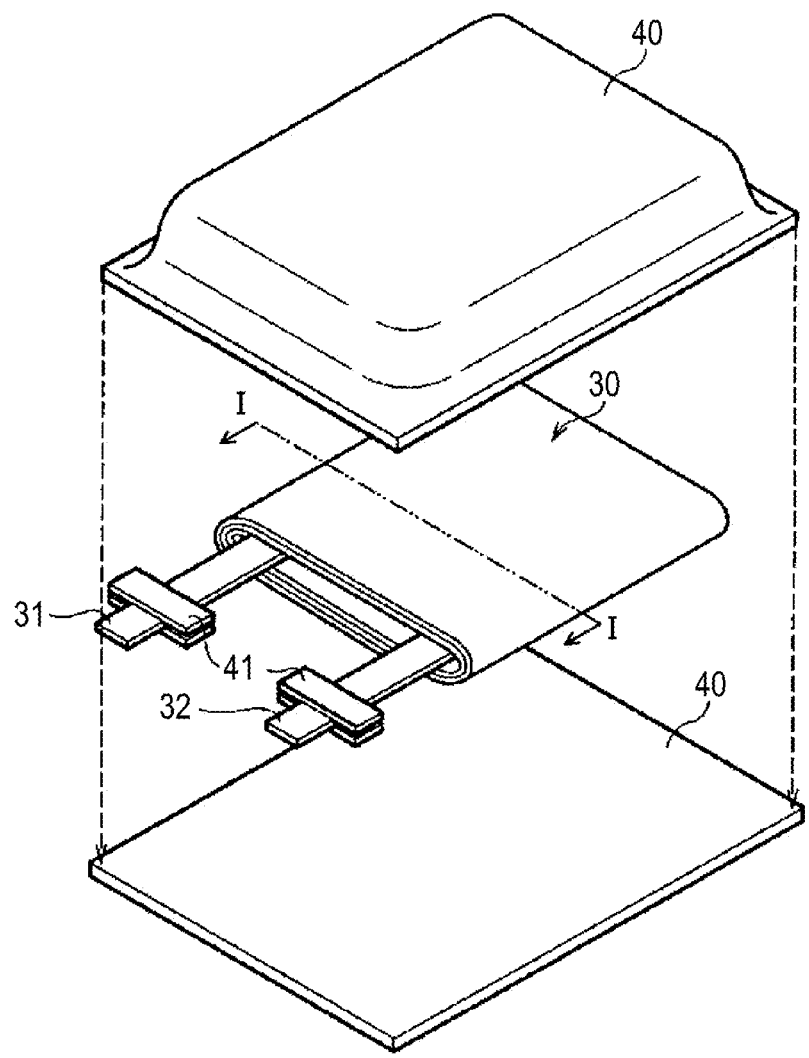
FIG. 4 is an exploded perspective view showing a configuration example of a nonaqueous electrolyte battery according to an embodiment.
Figure 5:
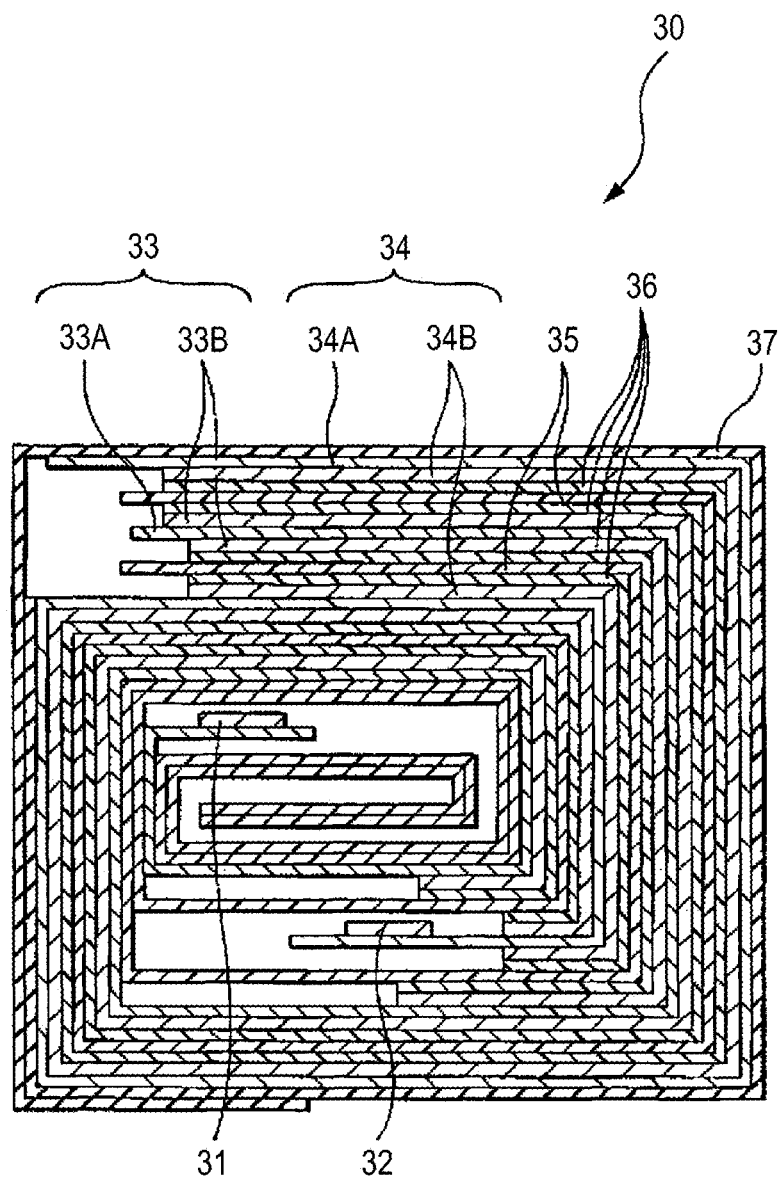
FIG. 5 is a sectional view along an I-I line of a wound electrode body in FIG. 3.

The nonaqueous electrolyte battery according to the third embodiment is described. FIG. 4 is an exploded perspective configuration example of the nonaqueous electrolyte battery according to the third embodiment; and FIG. 5 shows enlargedly a section along an I-I line of a wound electrode body 30 shown in FIG. 4.

This nonaqueous electrolyte battery has a configuration in which the wound electrode body 30 having mainly a positive electrode lead 31 and a negative electrode lead 32 installed therein is housed in the inside of a film-shaped package member 40. A battery structure using this film-shaped package member 40 is called a laminated film type.

Each of the positive electrode lead 31 and the negative electrode lead 32 is, for example, led out from the inside of the package member 40 toward the outside in the same direction. The positive electrode lead 31 is, for example, constituted of a metal material such as aluminum, and the negative electrode lead 32 is, for example, constituted of a metal material such as copper, nickel and stainless steel. Such a metal material is, for example, formed in a thin plate state or a network state.

The package member 40 is, for example, constituted of an aluminum laminated film obtained by sticking a nylon film, an aluminum foil and a polyethylene film in this order. For example, this package member 40 has a structure in which respective outer edges of the two rectangular aluminum laminated films are allowed to adhere to each other by means of fusion or with an adhesive in such a manner that the polyethylene film is disposed opposing to the wound electrode body 30.

A contact film 41 is inserted between the package member 40 and each of the positive electrode lead 31 and the negative electrode lead 32 for the purpose of preventing invasion of the outside air from occurring. This contact film 41 is constituted of a material having adhesion to each of the positive electrode lead 31 and the negative electrode lead 32. Examples of such a material include polyolefin resins such as polyethylene, polypropylene, modified polyethylene and modified polypropylene.

The package member 40 may also be constituted of a laminated film having other lamination structure, or constituted of a polymer film such as polypropylene or a metal film, in place of the foregoing aluminum laminated film.

FIG. 5 shows a sectional configuration along an I-I line of the wound electrode body 30 shown in FIG. 4. This wound electrode body 30 is one prepared by laminating a positive electrode 33 and a negative electrode 34 via a separator 35 and an electrolyte 36 and winding the laminate, and an outermost peripheral part thereof is protected by a protective tape 37.

The positive electrode 33 is, for example, one in which a positive electrode active material layer 33B is provided on the both surfaces of a positive electrode collector 33A. The negative electrode 34 is, for example, one in which a negative electrode active material layer 34B is provided on the both surfaces of a negative electrode collector 34A, and the negative electrode active material layer 34B and the positive electrode active material layer 33B are opposed to each other. The configurations of the positive electrode collector 33A, the positive electrode active material layer 33B, the negative electrode collector 34A, the negative electrode active material layer 34B and the separator 35 are the same as those of the positive electrode collector 21A, the positive electrode active material layer 21B, the negative electrode collector 22A, the negative electrode active material layer 22B and the separator 23, respectively in the second embodiment according to the present application.

The electrolyte 36 contains the electrolytic solution according to the first embodiment and a polymer compound capable of holding this electrolytic solution therein and is an electrolyte in a so-called gel form. The electrolyte in a gel form is preferable because not only a high ion conductivity (for example, 1 mS/cm or more at room temperature) is obtainable, but liquid leakage can be prevented from occurring.

As the polymer compound, a compound which is gelled upon absorption of the electrolytic solution can be used. Examples thereof include polyacrylonitrile, polyvinylidene fluoride, a copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, a styrene-butadiene rubber, a nitrile-butadiene rubber, polystyrene and polycarbonate. These materials may be used singly or in admixture of plural kinds thereof. Of these, polyacrylonitrile, polyvinylidene fluoride, polyhexafluoropropylene or polyethylene oxide is preferable. This is because such a compound is electrochemically stable.

(Manufacturing Method of Nonaqueous Electrolyte Battery)

This nonaqueous electrolyte battery is, for example, manufactured by the following three kinds of manufacturing methods (first to third manufacturing methods).

(First Manufacturing Method)

In a first manufacturing method, first of all, for example, the positive electrode active material layer 33B is formed on the both surfaces of the positive electrode collector 33A to fabricate the positive electrode 33, and the negative electrode active material layer 34B is formed on the both surfaces of the negative electrode collector 34A to fabricate the negative electrode 34, respectively, according to the same fabrication procedures of the positive electrode 21 and the negative electrode 22 according to the second embodiment.

Subsequently, a precursor solution containing the electrolytic solution according to the first embodiment, a polymer compound and a solvent is prepared and coated on each of the positive electrode 33 and the negative electrode 34, and the solvent is then volatilized to form the electrolyte 36 in a gel form. Subsequently, the positive electrode lead 31 is installed in the positive electrode collector 33A, and the negative electrode lead 32 is also installed in the negative electrode collector 34A.

Subsequently, the positive electrode 33 and the negative electrode 34 each having the nonaqueous electrolyte layer 36 formed thereon are laminated via the separator 35, the laminate is wound in a longitudinal direction thereof, and thereafter, the protective tape 37 is allowed to adhere to an outermost peripheral part thereof, thereby fabricating the wound electrode body 30. Finally, for example, the wound electrode body 30 is interposed between the two package members 40 in a film form, and the outer edges of the package members 40 are allowed to adhere to each other by means of heat fusion or the like, thereby enclosing the wound electrode body 30 therein. On that occasion, the contact film 41 is inserted between each of the positive electrode lead 31 and the negative electrode lead 32 and the package member 40. There is thus completed the nonaqueous electrolyte battery.

(Second Manufacturing Method)

In a second manufacturing method, first of all, the positive electrode lead 31 is installed in the positive electrode 33, and the negative electrode lead 32 is also installed in the negative electrode 34. Subsequently, the positive electrode 33 and the negative electrode 34 are laminated via the separator 35, the laminate is wound, and thereafter, the protective tape 37 is allowed to adhere to an outermost peripheral part thereof, thereby fabricating a wound body which is a precursor of the wound electrode body 30.

Subsequently, the wound body is interposed between the two package members 40 in a film form, and the outer edges exclusive of one side are allowed to adhere to each other by heat fusion or the like, thereby housing the wound body in the inside of the package member 40 in a bag form. Subsequently, am electrolyte composition containing the electrolytic solution according to the first embodiment, a monomer as a raw material of a polymer compound, a polymerization initiator and optionally, other material such as a polymerization inhibitor is prepared and injected into the inside of the package member 40 in a bag form, and thereafter, an opening of the package member 40 is hermetically sealed by means of heat fusion or the like. Finally, the monomer is heat polymerized to prepare a polymer compound, thereby forming the electrolyte 36 in a gel form. There is thus completed the nonaqueous electrolyte battery.

(Third Manufacturing Method)

In a third manufacturing method, first of all, a wound body is formed and housed in the inside of the package member 40 in a bag form in the same manner as in the foregoing second manufacturing method, except for using the separator 35 having a polymer compound coated on the both surfaces thereof.

Examples of the polymer compound which is coated on this separator 35 include polymers composed of, as a component, vinylidene fluoride, namely a homopolymer, a copolymer or a multi-component copolymer, or the like. Specific examples thereof include polyvinylidene fluoride; a binary copolymer composed of, as components, vinylidene fluoride and hexafluoropropylene; and a ternary copolymer composed of, as components, vinylidene fluoride, hexafluoropropylene and chlorotrifluoroethylene.

The polymer compound may contain one or two or more kinds of other polymer compounds together with the foregoing polymer composed of, as a component, vinylidene fluoride. Subsequently, the electrolytic solution according to the first embodiment is prepared and injected in the inside of the package material 40, and thereafter, an opening of the package member 40 is hermetically sealed by means of heat fusion or the like. Finally, the separator 35 is brought into intimate contact with each of the positive electrode 33 and the negative electrode 34 via the polymer compound upon heating while adding a weight to the package member 40. According to this, the electrolytic solution is impregnated into the polymer compound, and the polymer compound is gelled to form the electrolyte 36. There is thus completed the nonaqueous electrolyte battery.

<Effect>

In the third embodiment according to the present application, the same effects as those in the second embodiment according to the present application are brought.

4. Fourth Embodiment

A nonaqueous electrolyte battery according to a fourth embodiment is described. This nonaqueous electrolyte battery according to the fourth embodiment is the same as the nonaqueous electrolyte battery according to the third embodiment, except for using the electrolytic solution according to the first embodiment as it is in place of the material (electrolyte 36) in which the electrolytic solution according to the first embodiment is held by the polymer compound. In consequence, the configuration thereof is hereunder described centering on points which are different from those in the third embodiment according to the present application.

(Configuration of Nonaqueous Electrolyte Battery)

In the nonaqueous electrolyte battery according to the fourth embodiment, an electrolytic solution is used in place of the electrolyte 36 in a gel form. In consequence, the wound electrode body 30 has a configuration in which the electrolyte 36 is omitted, and the electrolytic solution is impregnated in the separator 35.

(Manufacturing Method of Nonaqueous Electrolyte Battery)

This nonaqueous electrolyte battery is, for example, manufactured in the following manner.

First of all, for example, a positive electrode active material, a binder and a conductive agent are mixed to prepare a positive electrode mixture, and this positive electrode mixture is dispersed in a solvent such as N-methyl-2-pyrrolidone to prepare a positive electrode mixture slurry. Subsequently, this positive electrode mixture slurry is coated on the both surfaces of the positive electrode collector 33A and dried, and the resultant is then compression molded to form the positive electrode active material layer 33B. There is thus fabricated the positive electrode 33. Subsequently, for example, the positive electrode lead 31 is joined with the positive electrode collector 33A by means of, for example, ultrasonic welding, spot welding or the like.

Also, for example, a negative electrode material and a binder are mixed to prepare a negative electrode mixture, which is then dispersed in a solvent such as N-methyl-2-pyrrolidone to prepare a negative electrode mixture slurry. Subsequently, this negative electrode mixture slurry is coated on the both surfaces of the negative electrode collector 34A and dried, and the resultant is then compression molded to form the negative electrode active material layer 34B. There is thus fabricated the negative electrode 34. Subsequently, for example, the negative electrode lead 32 is joined with the negative electrode collector 34A by means of, for example, ultrasonic welding, spot welding or the like.

Subsequently, the positive electrode 33 and the negative electrode 34 are wound via the separator 35; the resultant is interposed into the package member 40; and thereafter, the electrolytic solution according to the first embodiment is injected into the inside the package member 40, followed by hermetically sealing the package member 40. There is thus obtained the nonaqueous electrolyte battery shown in FIGS. 4 and 5.

<Effect>

In the fourth embodiment according to the present application, the same effects as those in the second embodiment according to the present application are brought.

5. Fifth Embodiment (Configuration of Nonaqueous Electrolyte Battery)

Figure 6:
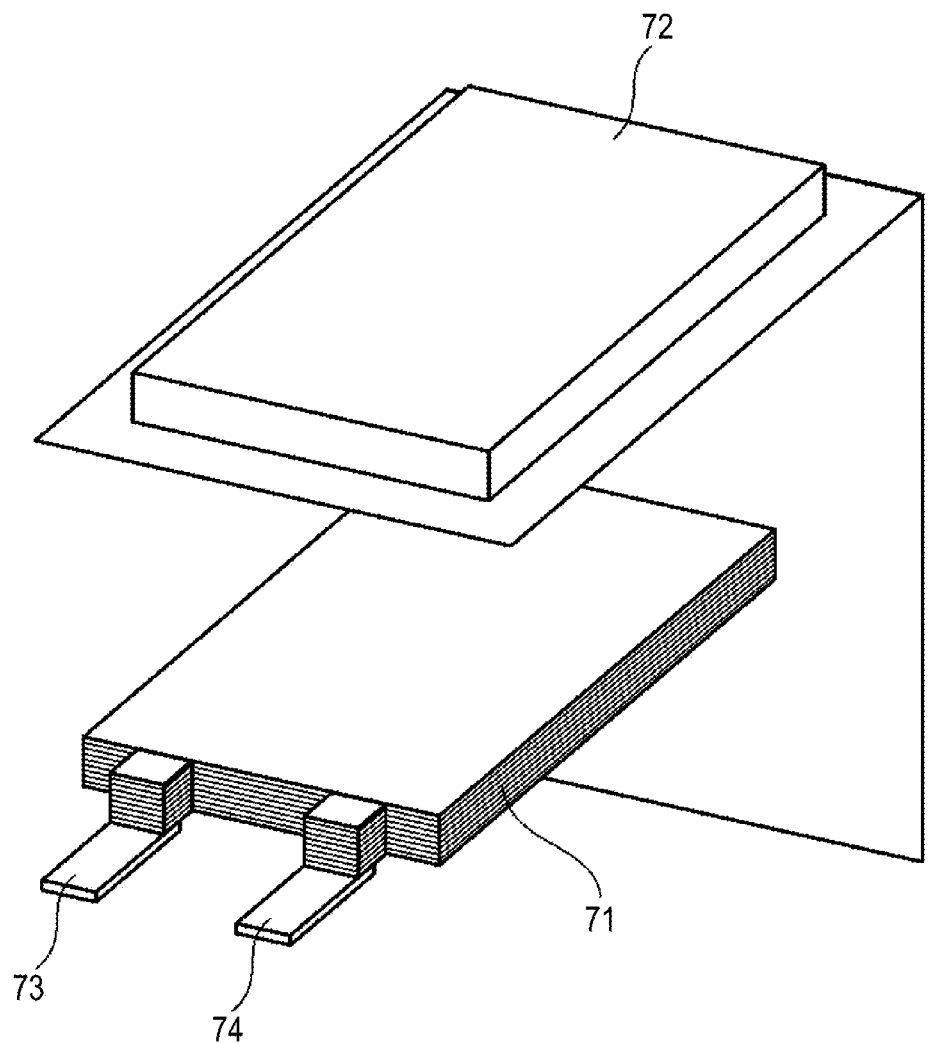
FIG. 6 is an exploded perspective view showing an example of a configuration of a nonaqueous electrolyte battery according to an embodiment.

FIG. 6 is an exploded perspective view showing an example of a configuration of a nonaqueous electrolyte battery according a fifth embodiment. As shown in FIG. 6, this nonaqueous electrolyte battery is one in which a battery device 71 having a positive electrode lead 73 and a negative electrode lead 74 installed therein is housed in the inside of a package member 72 in a film form and is able to realize downsizing, weight reduction and thinning.

Each of the positive electrode lead 73 and the negative electrode lead 74 is, for example, led out from the inside of the package member 72 toward the outside in the same direction.

Figure 7:
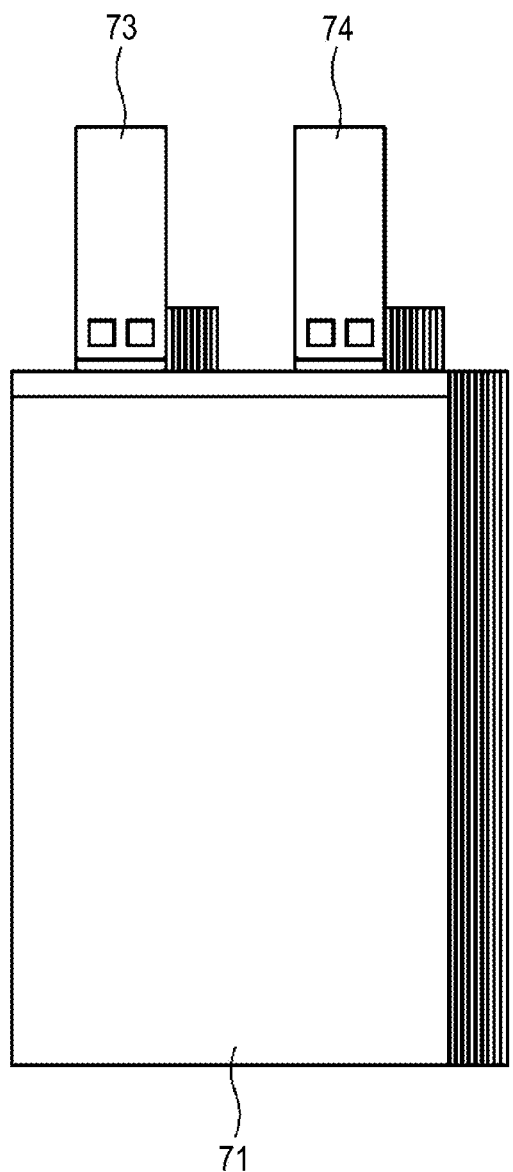
FIG. 7 is a perspective view showing an example of an appearance of a battery device.
Figure 8:
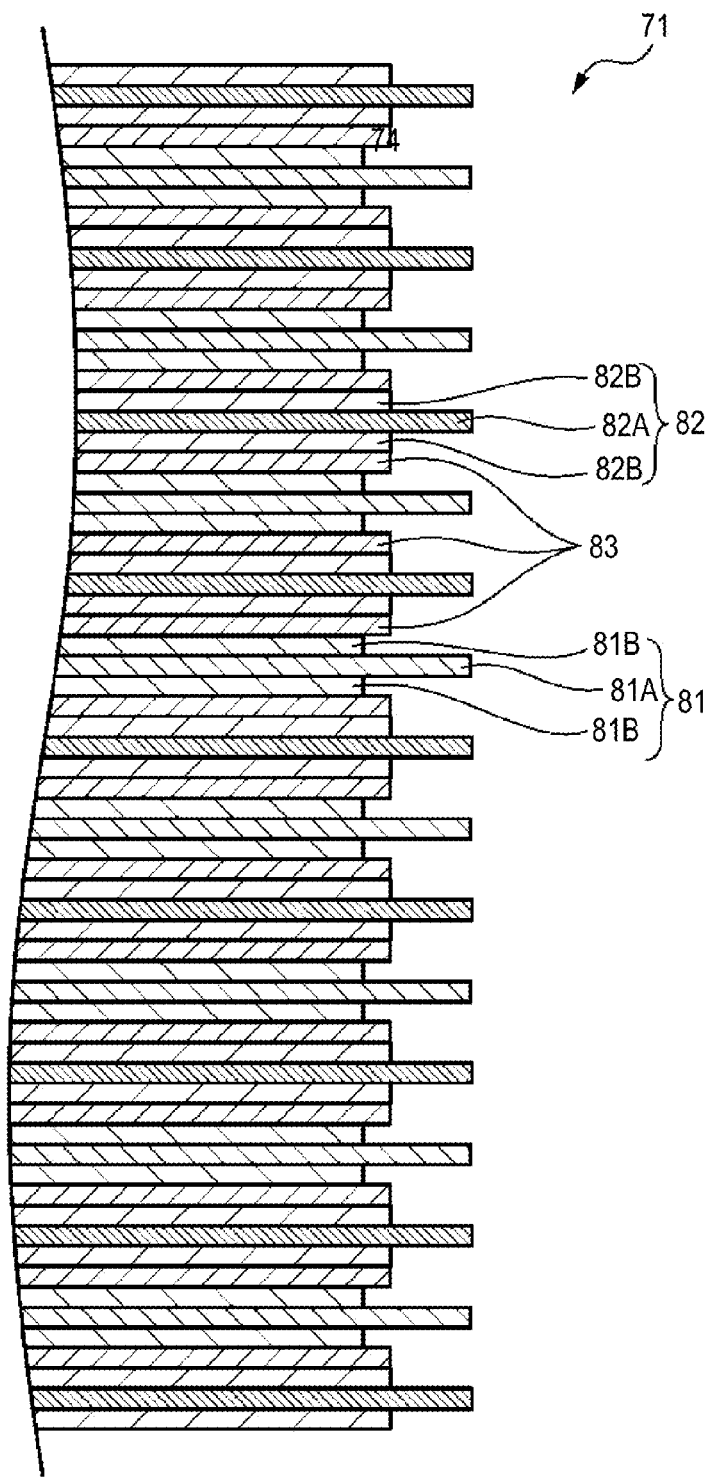
FIG. 8 is a sectional view showing an example of a configuration of a battery device.

FIG. 7 is a perspective view showing an example of an appearance of the battery device 71. FIG. 8 is a sectional view showing an example of a configuration of the battery device 71. As shown in FIGS. 7 and 8, this battery device 71 is a laminated electrode body in which a positive electrode 81 and a negative electrode 82 are laminated via a separator 83, and the battery device 71 is impregnated with the electrolytic solution according to the first embodiment.

Figure 9:
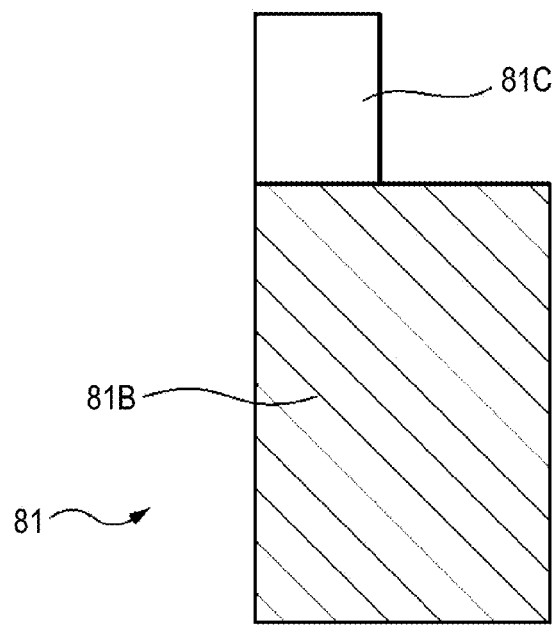
FIG. 9 is a plan view showing an example of a shape of a positive electrode.

For example, the positive electrode 81 has a structure in which a positive electrode active material layer 81B is provided on the both surfaces of a positive electrode collector 81A having a pair of surfaces. As shown in FIG. 9, the positive electrode 81 has a rectangular electrode portion and a collector-exposed portion 81C extending from one side of the electrode portion. This collector-exposed portion 81C is not provided with the positive electrode active material layer 81B and is in a state where the positive electrode collector 81A is exposed. The collector-exposed portion 81C is electrically connected to the positive electrode lead 73. While illustration is omitted, a region where the positive electrode active material layer 81B is existent only on one surface of the positive electrode collector 81A may be provided.

Figure 10:
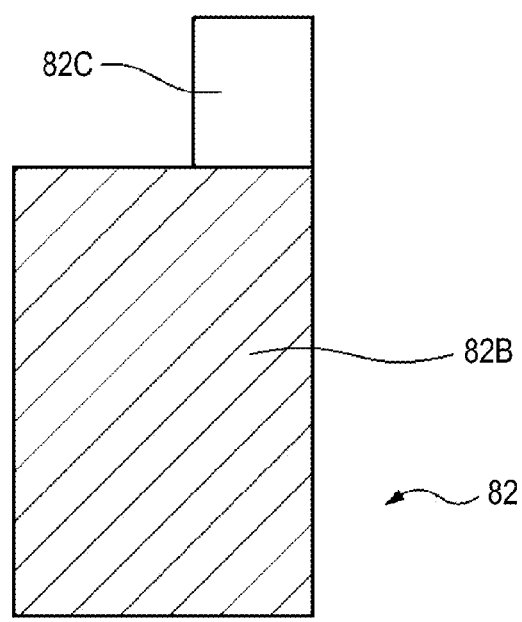
FIG. 10 is a plan view showing an example of a shape of a negative electrode.

For example, the negative electrode 82 has a structure in which a negative electrode active material layer 82B is provided on the both surfaces of a negative electrode collector 82A having a pair of surfaces. As shown in FIG. 10, the negative electrode 82 has a rectangular electrode portion and a collector-exposed portion 82C extending from one side of the electrode portion. This collector-exposed portion 82C is not provided with the negative electrode active material layer 82B and is in a state where the negative electrode collector 82A is exposed. The collector-exposed portion 82C is electrically connected to the negative electrode lead 74. While illustration is omitted, a region where the negative electrode active material layer 82B is existent only on one surface of the negative electrode collector 82A may be provided.

Figure 11:
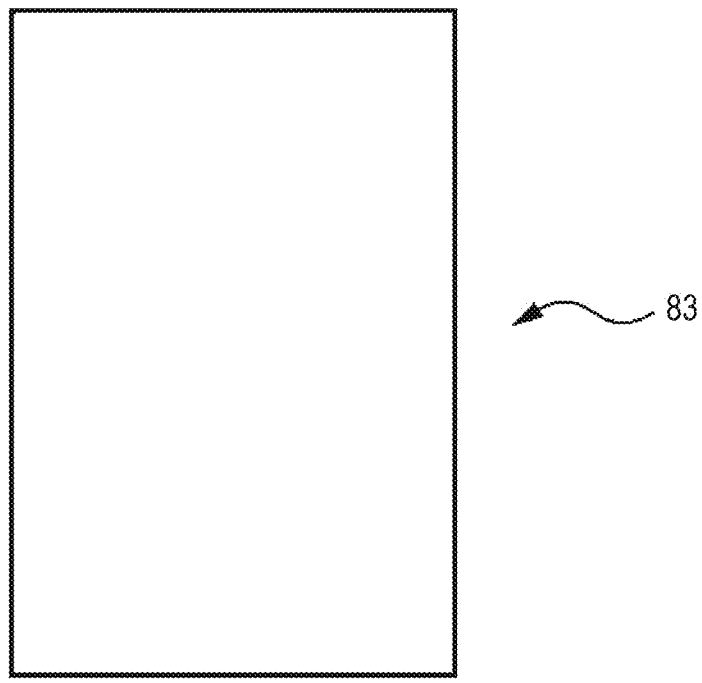
FIG. 11 is a plan view showing an example of a shape of a separator.

As shown in FIG. 11, the separator 83 has a shape such as a rectangular shape.

Materials constituting the positive electrode collector 81A, the positive electrode active material layer 81B, the negative electrode collector 82A, the negative electrode active material layer 82B and the separator 83 are the same as those in the positive electrode collector 21A, the positive electrode active material layer 21B, the negative electrode collector 22A, the negative electrode active material layer 22B and the separator 23, respectively in the second embodiment according to the present application.

(Manufacturing Method of Nonaqueous Electrolyte Battery)

The thus configured nonaqueous electrolyte battery can be, for example, manufactured in the following manner.

(Fabrication of Positive Electrode)

The positive electrode 81 is fabricated in the following manner. First of all, for example, a positive electrode active material, a binder and a conductive agent are mixed to prepare a positive electrode mixture, and this positive electrode mixture is dispersed in an organic solvent such as N-methylpyrrolidone to prepare a positive electrode mixture slurry in a paste form. Subsequently, the positive electrode mixture slurry is coated on the both surfaces of the positive electrode collector 81A and dried, followed by pressing to form the positive electrode active material layer 81B. Thereafter, the resultant is cut into the shape shown in FIG. 9, or the like, thereby obtaining the positive electrode 81.

(Fabrication of Negative Electrode)

The negative electrode 82 is fabricated in the following manner. First of all, for example, a negative electrode active material, a binder and a conductive agent are mixed to prepare a negative electrode mixture, and this negative electrode mixture is dispersed in an organic solvent such as N-methylpyrrolidone to prepare a negative electrode mixture slurry in a paste form. Subsequently, the negative electrode mixture slurry is coated on the both surfaces of the negative electrode collector 82A and dried, followed by pressing to form the negative electrode active material layer 82B. Thereafter, the resultant is cut into the shape shown in FIG. 10, or the like, thereby obtaining the negative electrode 82.

(Fabrication of Battery Device)

The battery device 71 is fabricated in the following manner. First of all, a polypropylene-made microporous film or the like is cut into the shape shown in FIG. 11, thereby fabricating the separator 83. Subsequently, a plural number of the thus obtained negative electrodes 82, positive electrodes 81 and separators 83 are, for example, laminated in the order of the negative electrode 82, the separator 83, the positive electrode 81, . . . , the positive electrode 81, the separator 83 and the negative electrode 82, thereby fabricating the battery device 71 as shown in FIG. 8.

Subsequently, the collector-exposed portion 81C of the positive electrode 81 is welded to the positive electrode lead 73. Similarly, the collector-exposed portion 82C of the negative electrode 82 is welded to the negative electrode lead 74. Subsequently, after impregnating the electrolytic solution in the battery device 71, the battery device 71 is interposed between the package members 72, and the outer edges of the package members 72 are allowed to adhere to each other by means of heat fusion or the like, thereby sealing the battery device 71 therein. On that occasion, each of the positive electrode lead 73 and the negative electrode lead 74 is disposed so as to come out from the package member 72 via the heat-fused part, thereby forming positive and negative electrode terminals. There is thus obtained the desired nonaqueous electrolyte battery.

<Effect>

The fifth embodiment according to the present application has the same effects as those in the second embodiment according to the present application.

6. Sixth Embodiment

Next, a sixth embodiment according to the present application is described. A nonaqueous electrolyte battery according to this sixth embodiment is one using an electrolyte layer in a gel form in place of the electrolytic solution in the nonaqueous electrolyte battery according to the fifth embodiment. The same portions as those in the fifth embodiment are given the same symbols, and their descriptions are omitted.

(Configuration of Nonaqueous Electrolyte Battery)

Figure 12:
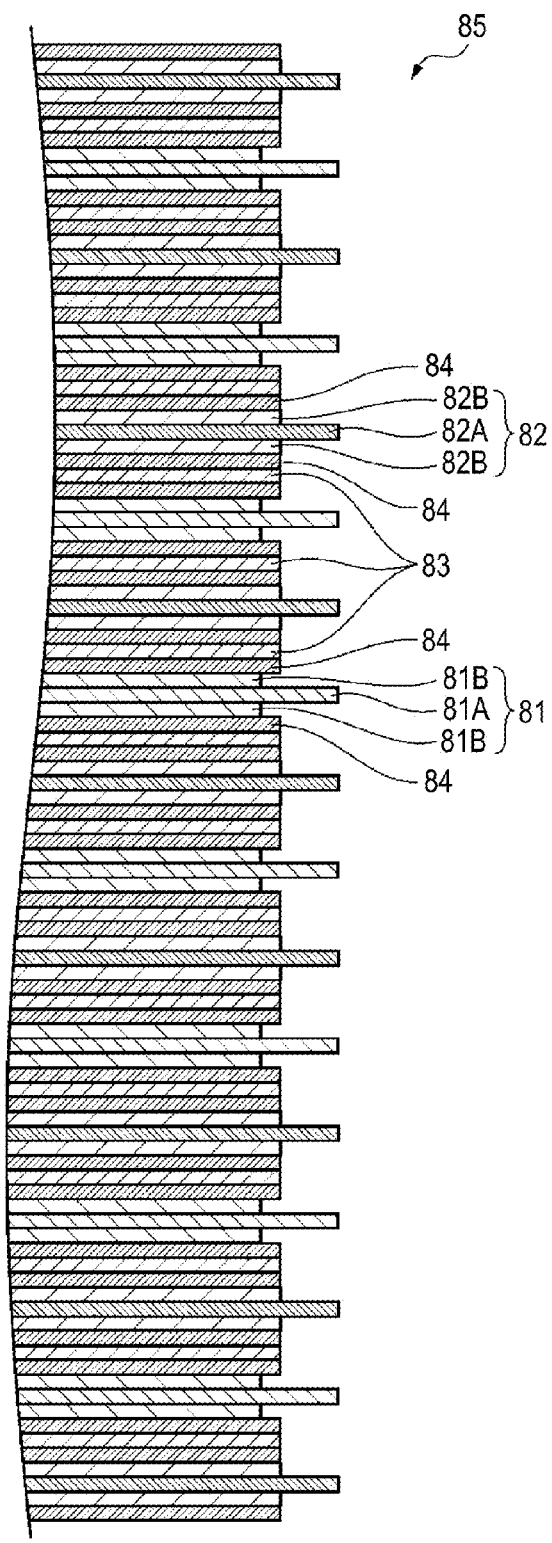
FIG. 12 is a sectional view showing an example of a configuration of a battery device which is used for a nonaqueous electrolyte battery according an embodiment.

FIG. 12 is a sectional view showing an example of a configuration of a battery device to be used for the nonaqueous electrode secondary battery according to the sixth embodiment according to the present application. A battery device 85 is one in which the positive electrode 81 and the negative electrode 82 are laminated via the separator 83 and an electrolyte layer 84.

The electrolyte layer 84 contains the electrolytic solution according to the first embodiment and a polymer compound serving as a holding material capable of holding this electrolytic solution therein and takes a so-called gel form. The electrolyte layer 84 in a gel form is preferable because not only a high ion conductivity is obtainable, but liquid leakage of the battery can be prevented from occurring. A constitution of the polymer compound is the same as that in the nonaqueous electrolyte battery according to the third embodiment.

(Manufacturing Method of Nonaqueous Electrolyte Battery)

The thus configured nonaqueous electrolyte battery can be, for example, manufactured in the following manner.

First of all, a precursor solution containing a solvent, an electrolyte salt, a polymer compound and a mixed solvent is coated on each of the positive electrode 81 and the negative electrode 82, and the mixed solvent is then vaporized to form the electrolyte layer 84. The nonaqueous electrolyte battery can be obtained by following the same subsequent steps as those in the fifth embodiment according to the present application, except that the positive electrode 81 and the negative electrode 82 each having the electrolyte layer 84 formed thereon are used.

<Effect>

The sixth embodiment according to the present application has the same effects as those in the fifth embodiment according to the present application.

EXAMPLES

The present application is specifically described below with reference to the following Examples, but it should not be construed that the present application is limited only to these Examples. In the following description, the mass of the heteropolyacid is defined to be a value obtained by subtracting the mass of bound water which the heteropolyacid has; and the mass of the heteropolyacid compound is defined to be a value obtained by subtracting the mass of bound water which the heteropolyacid compound has.

For the sake of convenience for the description, silicomolybdic acid heptahydrate, silicotungstic acid heptahydrate, phosphomolybdic acid heptahydrate and phosphotungstic acid heptahydrate are referred to as the following Compounds A to D, respectively.

Compound A: Silicomolybdic acid heptahydrate
Compound B: Silicotungstic acid heptahydrate
Compound C: Phosphomolybdic acid heptahydrate
Compound D: Phosphotungstic acid heptahydrate Also, for the sake of convenience for the description, lithium monofluorophosphate, magnesium monofluorophosphate, lithium difluorophosphate and magnesium difluorophosphate are referred to as the following Compounds E to H, respectively.

Compound E: Lithium monofluorophosphate
Compound F: Magnesium monofluorophosphate
Compound G: Lithium difluorophosphate
Compound H: Magnesium difluorophosphate

Example 1-1

First of all, 91 parts by mass of lithium cobaltate as a positive electrode active material, 6 parts by mass of graphite as a conductive agent and 3 parts by mass of polyvinylidene fluoride as a binder were mixed, to which was then added N-methylpyrrolidone to obtain a positive electrode mixture slurry. Subsequently, this positive electrode mixture slurry was uniformly coated on the both surfaces of a 12 µm-thick aluminum foil serving as a positive electrode collector, and after drying, the resultant was compression molded by a roll press to form a positive electrode active material layer. Thereafter, a positive electrode lead made of aluminum was installed in an end of the positive electrode collector by means of welding.

Also, 97 parts by mass of an artificial graphite powder as a negative electrode active material and 3 parts by mass of polyvinylidene fluoride as a binder were mixed, to which was then added N-methylpyrrolidone to obtain a negative electrode mixture slurry. Subsequently, this positive electrode mixture slurry was uniformly coated on the both surfaces of a 15 µm-thick copper foil serving as a negative electrode collector, and after drying, the resultant was compression molded by a roll press to form a negative electrode active material layer. Thereafter, a negative electrode lead made of nickel was installed in an end of the negative electrode collector.

Subsequently, the positive electrode, a separator made of a microporous polypropylene film (thickness: 25 µm) and the negative electrode were laminated in this order, the laminate was spirally wound many times, and an end portion of winding was then fixed by an adhesive tape to form a wound electrode body. Subsequently, a nickel-plated iron-made battery was prepared; the wound electrode body was interposed between a pair of insulating plates; a negative electrode lead was welded to the battery can, and a positive electrode lead was also welded to a safety valve mechanism; and the wound electrode body was housed in the inside of the battery can. Subsequently, an electrolytic solution was injected into the inside of the battery can in a vacuum mode.

As the electrolytic solution, one prepared in the following manner was used. That is, a solution obtained by dissolving 1.2 moles/kg of lithium hexafluorophosphate ($LiPF_6$) as an electrolyte salt in a mixed solution of ethylene carbonate (EC) and dimethyl carbonate (DMC) in a mass ratio of 3/7 was prepared. In this solution, Compound A as the heteropolyacid compound and Compound G as the difluorophosphate were dissolved in a concentration of Compound A of 0.01% by mass and in a concentration of Compound G of 500 ppm, respectively, thereby preparing the electrolytic solution. There was thus fabricated a cylindrical type battery of Example 1-1.

Example 1-2

A battery was fabricated in the same manner as in Example 1-1, except that on the occasion of preparing the electrolytic solution, the concentration of Compound A was changed to 0.05% by mass.

Example 1-3

A battery was fabricated in the same manner as in Example 1-1, except that on the occasion of preparing the electrolytic solution, the concentration of Compound A was changed to 0.1% by mass.

Example 1-4

A battery was fabricated in the same manner as in Example 1-1, except that on the occasion of preparing the electrolytic solution, the concentration of Compound A was changed to 0.5% by mass.

Example 1-5

A battery was fabricated in the same manner as in Example 1-1, except that on the occasion of preparing the electrolytic solution, the concentration of Compound A was changed to 1% by mass, and the concentration of Compound G was changed to 5 ppm.

Example 1-6

A battery was fabricated in the same manner as in Example 1-5, except that on the occasion of preparing the electrolytic solution, the concentration of Compound G was changed to 10 ppm.

Example 1-7

A battery was fabricated in the same manner as in Example 1-5, except that on the occasion of preparing the electrolytic solution, the concentration of Compound G was changed to 50 ppm.

Example 1-8

A battery was fabricated in the same manner as in Example 1-5, except that on the occasion of preparing the electrolytic solution, the concentration of Compound G was changed to 500 ppm.

Example 1-9

A battery was fabricated in the same manner as in Example 1-5, except that on the occasion of preparing the electrolytic solution, the concentration of Compound G was changed to 1,000 ppm.

Example 1-10

A battery was fabricated in the same manner as in Example 1-5, except that on the occasion of preparing the electrolytic solution, the concentration of Compound G was changed to 5,000 ppm.

Example 1-11

A battery was fabricated in the same manner as in Example 1-5, except that on the occasion of preparing the electrolytic solution, the concentration of Compound G was changed to 10,000 ppm.

Example 1-12

A battery was fabricated in the same manner as in Example 1-8, except that on the occasion of preparing the electrolytic solution, the concentration of Compound A was changed to 3% by mass.

Example 1-13

A battery was fabricated in the same manner as in Example 1-8, except that on the occasion of preparing the electrolytic solution, the concentration of Compound A was changed to 5% by mass.

Comparative Example 1-1

A battery was fabricated in the same manner as in Example 1-1, except that on the occasion of preparing the electrolytic solution, neither Compound A nor Compound G was added.

Comparative Example 1-2

A battery was fabricated in the same manner as in Example 1-1, except that on the occasion of preparing the electrolytic solution, the concentration of Compound A was changed to 1% by mass, and Compound G was not added.

Comparative Example 1-3

A battery was fabricated in the same manner as in Example 1-1, except that on the occasion of preparing the electrolytic solution, Compound A was not added.

Comparative Example 1-4

A battery was fabricated in the same manner as in Example 1-1, except that on the occasion of preparing the electrolytic solution, Compound A was not added, and the concentration of Compound G was changed to 1,000 ppm.

The batteries of Examples 1-1 to 1-13 and Comparative Examples 1-1 to 1-4 were subjected to the following initial capacity and cycle tests and high-rate discharge test.

(Initial Capacity and Cycle Tests)

First of all, each of the batteries was subjected to charge/discharge for 2 cycles at a current of 0.2 C in an atmosphere at 23° C., and a discharge capacity at the second cycle was measured. Subsequently, the charge/discharge was repeated for 300 cycles in an atmosphere at 23° C., and a discharge capacity retention rate at the 300th cycle to discharge capacity at the second cycle was determined according to the following expression.

ti Discharge capacity retention rate (%)={(Discharge capacity at the 300th cycle)/(Discharge capacity at the second cycle)}×100(%)

As to the charge/discharge condition, the battery was subjected to constant-current charge at a current of 0.2 C to an upper limit voltage of 4.2 V and then subjected to constant-voltage charge at a constant voltage of the upper limit voltage until a current value reached 0.05 C, followed by subjecting to constant-current discharge at a current of 0.2 C to a final voltage of 3.0 V. The term "0.2 C" referred to herein is a current value at which a theoretical capacity is completely discharged for 5 hours.

(High-Rate Discharge Test)

First of all, each of the batteries was subjected to charge/discharge for 2 cycles at a current of 0.2 C in an atmosphere at 23° C., and a discharge capacity at the second cycle was measured. Subsequently, the battery after recharge was subjected to constant-current discharge at a current of 10 C to a final voltage of 3.0 V in an atmosphere of 23° C., thereby calculating a capacity retention rate by the discharge current value according to the following expression.

High-rate discharge capacity retention rate (%)={(10 C discharge capacity)/(0.2 C discharge capacity)}×100(%)

As to the initial charge/discharge condition, the same procedures as those in examining the cycle characteristic were applied. Also, an external temperature of the cell at the 10 C discharge test was recorded, thereby measuring a maximum attained temperature of the cell. The term "10 C" referred to herein is a current value at which a theoretical capacity is completely discharged for 0.1 hours.

The test results are shown in Table 1.

TABLE 1

|  | Heteropolyacid compound | | Fluorophosphate | | Discharge capacity retention rate at the 300th cycle (%) | 10 C/0.2 C Discharge capacity retention rate (%) | Cell external temperature at the time of 10 C discharge (° C.) |
|---|---|---|---|---|---|---|---|
|  | Kind | % by mass | Kind | ppm | | | |
| Example 1-1 | Compound A | 0.1 | Compound G | 500 | 70 | 72 | 70 |
| Example 1-2 |  | 0.05 |  |  | 71 | 75 | 67 |
| Example 1-3 |  | 0.1 |  |  | 74 | 79 | 65 |
| Example 1-4 |  | 0.5 |  |  | 76 | 82 | 62 |
| Example 1-5 |  | 1 |  | 5 | 68 | 80 | 65 |
| Example 1-6 |  |  |  | 10 | 72 | 82 | 63 |
| Example 1-7 |  |  |  | 50 | 75 | 83 | 62 |
| Example 1-8 |  |  |  | 500 | 78 | 83 | 61 |
| Example 1-9 |  |  |  | 1000 | 78 | 82 | 61 |
| Example 1-10 |  |  |  | 5000 | 74 | 80 | 64 |

TABLE 1-continued

| | Heteropolyacid compound | | Fluorophosphate | | Discharge capacity retention rate at the 300th cycle (%) | 10 C/0.2 C Discharge capacity retention rate (%) | Cell external temperature at the time of 10 C discharge (° C.) |
|---|---|---|---|---|---|---|---|
| | Kind | % by mass | Kind | ppm | | | |
| Example 1-11 | | | | 10000 | 70 | 77 | 65 |
| Example 1-12 | | 3 | | 500 | 76 | 81 | 63 |
| Example 1-13 | | 5 | | | 74 | 80 | 64 |
| Comparative Example 1-1 | — | — | — | — | 62 | 70 | 72 |
| Comparative Example 1-2 | Compound A | 1 | — | — | 63 | 78 | 66 |
| Comparative Example 1-3 | — | — | Compound G | 500 | 62 | 70 | 74 |
| Comparative Example 1-4 | — | — | | 1000 | 60 | 67 | 78 |

As shown in Table 1, in Examples 1-1 to 1-13, the cycle characteristic and the rate characteristic at the time of large-current discharge were improved compared with comparative Example 1-1. When both the heteropolyacid compound and the fluorophosphate are added to the electrolytic solution, in view of the presence of the heteropolyacid compound, the resistance of SEI for protecting the negative electrode becomes small, and simultaneously, SEI to be formed so as to contain the fluorophosphate prevents decomposition of the solvent and the salt in the electrolytic solution. The fact that the increase of the internal resistance of the battery is suppressed also brings suppression of the increase of the battery temperature by a Joule heat at the time of high-rate discharge, whereby deterioration of the battery characteristic can be more suppressed. According to this synergistic effect, it may be considered that in Examples 1-1 to 1-13, the cycle characteristic and the rate characteristic at the time of large-current discharge were improved. As to Example 1-1, the battery after the initial charge was disassembled, and the negative electrode was taken out. As a result, it was confirmed that the coating formed on the surface of the negative electrode is amorphous and takes a gel form.

On the other hand, in Comparative Example 1-2, though the heteropolyacid compound was added to the electrolytic solution, the fluorophosphate was not added, so that the rate characteristic at the time of large-current discharge was worse, and the cycle characteristic was not substantially improved as compared to the corresponding working example. In Comparative Examples 1-3 to 1-4, though the fluorophosphate was added to the electrolytic solution, the heteropolyacid compound was note added, so that the cycle characteristic was deteriorated as compared with the corresponding working examples. When only the fluorophosphate was added, the battery resistance could not be lowered, but the rate characteristic as the resistance component was rather deteriorated.

Example 2-1

A battery was fabricated in the same manner as in Example 1-8, except that on the occasion of preparing the electrolytic solution, Compound E was added in place of Compound G.

Examples 2-2 to 2-4

Batteries were fabricated in the same manner as in Example 2-1, except that on the occasion of preparing the electrolytic solution, each of Compound B, Compound C and Compound D was added in place of Compound A.

Examples 2-5 to 2-8

Batteries were fabricated in the same manners as in Examples 2-1 to 2-4, respectively, except that on the occasion of preparing the electrolytic solution, Compound F was added in place of Compound E.

Examples 2-9 to 2-12

Batteries were fabricated in the same manners as in Examples 2-1 to 2-4, respectively, except that on the occasion of preparing the electrolytic solution, Compound G was added in place of Compound E.

Examples 2-13 to 2-16

Batteries were fabricated in the same manners as in Examples 2-1 to 2-4, respectively, except that on the occasion of preparing the electrolytic solution, Compound H was added in place of Compound E.

The batteries of Examples 2-1 to 2-16 were subjected to the foregoing initial capacity and cycle tests and high-rate discharge test. The test results are shown in Table 2.

TABLE 2

| | Heteropolyacid compound | | Fluorophosphate | | Discharge capacity retention rate at the 300th cycle (%) | 10 C/0.2 C Discharge capacity retention rate (%) | Cell external temperature at the time of 10 C discharge (° C.) |
|---|---|---|---|---|---|---|---|
| | Kind | % by mass | Kind | ppm | | | |
| Example 2-1 | Compound A | 1 | Compound E | 500 | 76 | 80 | 63 |
| Example 2-2 | Compound B | | | | 77 | 81 | 62 |
| Example 2-3 | Compound C | | | | 74 | 79 | 63 |
| Example 2-4 | Compound D | | | | 75 | 79 | 64 |
| Example 2-5 | Compound A | 1 | Compound F | 500 | 75 | 82 | 62 |

TABLE 2-continued

| | Heteropolyacid compound | | Fluorophosphate | | Discharge capacity retention rate at the 300th cycle (%) | 10 C/0.2 C Discharge capacity retention rate (%) | Cell external temperature at the time of 10 C discharge (° C.) |
|---|---|---|---|---|---|---|---|
| | Kind | % by mass | Kind | ppm | | | |
| Example 2-6 | Compound B | | | | 76 | 82 | 61 |
| Example 2-7 | Compound C | | | | 73 | 81 | 63 |
| Example 2-8 | Compound D | | | | 73 | 81 | 62 |
| Example 2-9 | Compound A | 1 | Compound G | 500 | 78 | 83 | 61 |
| Example 2-10 | Compound B | | | | 79 | 83 | 60 |
| Example 2-11 | Compound C | | | | 75 | 80 | 62 |
| Example 2-12 | Compound D | | | | 77 | 81 | 62 |
| Example 2-13 | Compound A | 1 | Compound H | 500 | 77 | 83 | 60 |
| Example 2-14 | Compound B | | | | 79 | 84 | 58 |
| Example 2-15 | Compound C | | | | 75 | 81 | 62 |
| Example 2-16 | Compound D | | | | 76 | 81 | 61 |

As shown in Table 2, the addition of Compound A or Compound B to the electrolytic solution was more excellent in the cycle characteristic and the discharge capacity retention rate at a high rate than the addition of Compound C or Compound D to the electrolytic solution. It may be considered that this is caused due to the matter that the silicon-containing heteropolyacid and/or heteropolyacid compound as in Compound A or Compound B is electrochemically or thermally stable and has a high protection active against the electrode as compared with the phosphorus-containing heteropolyacid and/or heteropolyacid compound as in Compound C or Compound D.

Also, the addition of Compound G or Compound H to the electrolytic solution was more excellent in the cycle characteristic and the discharge capacity retention rate at a high rate than the addition of Compound E or Compound F to the electrolytic solution. It may be considered that this is caused due to the matter that since the difluorophosphate as in Compound G or Compound H has a composition close to lithium hexafluorophosphate used as the electrolyte salt as compared with the monofluorophosphate as in Compound E or Compound F, the increase of resistance can be more effectively suppressed.

7. Other Embodiments

It should not be construed that the present application is limited to the foregoing embodiments according to the present application, and various modifications and applications can be made therein so far as the gist of the present application is not deviated.

For example, in the foregoing embodiments and working examples, the batteries having a laminated film type or cylindrical type battery structure, the batteries having a wound structure in which the electrodes are wound and the batteries of a stack type having a structure in which the electrodes are stacked have been described, but it should not be construed that the present application is limited thereto. For example, the present application can be similarly applied to batteries having other battery structure such as a rectangular type, a coin type and a button type, and the same effects can be obtained.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An electrolytic solution comprising:
an electrolyte salt; and
a nonaqueous solvent including
a heteropolyacid and/or a heteropolyacid compound mixed within the nonaqueous solvent, where the heteropolyacid is a condensate of two or more kinds of an oxoacid, and
a monofluorophosphate and/or a difluorophosphate mixed within the nonaqueous solvent and contained in a ratio of 10-5,000 ppm in the electrolyte solution,
wherein the heteropolyacid and/or the heteropolyacid compound is a compound represented by the following formula (1)

$$A_x[BD_{12}O_{40}] \cdot yH_2O \qquad (1)$$

wherein
A represents Li, Na, K, Rb, Cs, Mg, Ca, Al, NH$_4$, a quaternary ammonium salt or a phosphonium salt; B represents P, Si, As or Ge; D represents at least one element selected from the group consisting of Ti, V, Cr, Mn, Fe, Co, Ni, Cu, Zn, Ga, Zr, Nb, Mo, Tc, Rh, Cd, In, Sn, Ta, W, Re and Tl; and x and y are values falling within the ranges of (0≤x≤7) and (0≤y≤50), respectively,
wherein the heteropolyacid or heteropolyacid compound has a structure selected from the group consisting of a Keggin structure, an Anderson structure and a Dawson structure, and has a structure in which a heteropolyacid ion thereof is soluble in the solvent.

2. The electrolytic solution according to claim 1, wherein a content of the heteropolyacid and/or the heteropolyacid compound is 0.01% by mass or more and not more than 3% by mass.

3. The electrolytic solution according to claim 1, wherein a cation constituting the monofluorophosphate and/or the difluorophosphate is a lithium cation, a magnesium cation or an ammonium cation.

4. The electrolytic solution according to claim 1, wherein the solvent contains at least one member of compounds selected from the group consisting of unsaturated cyclic carbonates and halogenated cyclic carbonates.

5. The electrolytic solution according to claim 1, wherein the electrolyte salt contains at least one member selected from the group consisting of lithium hexafluorophosphate, lithium tetrafluoroborate, lithium perchlorate and lithium hexafluoro arsenate.

6. The electrolytic solution according to claim 1, wherein the solvent includes at least one member selected from the group consisting of ethylene carbonate, propylene carbonate, dimethyl carbonate, diethyl carbonate, and ethyl methyl carbonate.

7. The electrolytic solution according to claim 4, wherein the unsaturated cyclic carbonate includes at least one of vinylene carbonate based compounds, vinyl ethylene carbonate based compounds, and methylene ethylene based carbonate based compounds.

8. The electrolytic solution according to claim 4, wherein the halogenated cyclic carbonate includes at least one of 4-fluoro-1,3-dioxolan-2-one, 4-chloro-1,3-dioxolan-2-one, 4,5-difluoro-1,3-dioxolan-2-one, tetrafluoro-1,3-dioxolan-2-one, 4-chloro-5-fluoro-1,3-dioxolan-2-one,4,5-dichloro-1,3-dioxo lan-2-one, tetrachloro-1,3-dioxolan-2-one, 4,5-bistrifluoromethyl-1,3-dioxolan-2-one, 4-trifluoromethyl-1,3-dioxolan-2-one, 4,5-difluoro-4,5-dimethyl-1,3-dioxolan-2-one, 4,4-difluoro-5-methyl-1,3-dioxolan-2-one, 4-ethyl-5,5-difluoro -1,3-dioxolan-2-one, 4-fluoro-5-trifluoromethyl-1,3-dioxolan-2-one, 4-methyl-5-trifluoromethyl -1,3-dioxolan-2-one, 4-fluoro-4,5-dimethyl-1,3-dioxolan-2-one, 5-(1,1-difluoroethyl)-4,4-difluoro- 1,3-dioxolan-2-one, 4,5-dichloro-4,5-dimethyl- 1,3-dioxolan-2-one, 4-ethyl-5-fluoro -1,3-dioxolan-2-one, 4-ethyl-4,5-difluoro- 1,3-dioxolan-2-one, 4-ethyl-4,5,5-trifluoro- 1,3-dioxolan-2-one, and 4-fluoro-4-methyl-1,3-dioxolan-2-one.

9. The electrolytic solution according to claim 1, further comprising at least one of
a heteropolyacid selected from the group consisting of heteropolytungstic acids, heteropolymolybdic acids, phosphovanadomolybdic acids, phosphotungstomolybdic acids, silicovanadomolybdic acids, and silicotungstomolybdic acids, and
a heteropolyacid compound selected from the group consisting of heteropolytungstic acid compounds, heteropolymolybdic acid compounds, phosphovanadomolybdic acid compounds, phosphotungstomolybdic acid compounds, silicovanadomolybdic acid compounds, and silicotungstomolybdic acid compounds.

10. The electrolytic solution according to claim 1, wherein the heteropolyacid compound has a cation selected from the group consisting of $Li^+$, $Na^+$, $K^+$, $Rb^+$, $Cs^+$, $R_4N^+$, $R_4P^+$, wherein R is H or a hydrocarbon group having not more than 10 carbon atoms.

11. The electrolytic solution according to claim 1, further comprising at least one of
heteropolytungstic acid compounds including sodium silicotungstate, sodium phosphotungstate, ammonium phosphotungstate, and a silicotungstic acid tetra-tetra-n-butylphosphonium salt;
heteropolymolybdic acid compounds including sodium phosphomolybdate, ammonium phosphomolybdate, and a phosphomolybdic acid tri-tetra-n-butylammonium salt; and
a phosphotungstomolybdic acid tri-tetra-n-ammonium salt.

12. The electrolytic solution according to claim 1, wherein the heteropolyacid and/or the heteropolyacid compound includes:
a polyatom selected from the element group (a) consisting of Mo, W, Nb and V; or
a polyatom selected from the element group (a), where a part of the polyatom is substituted with at least one element selected from element group (b) consisting of Ti, Cr, Mn, Fe, Co, Ni, Cu, Zn, Ga, Zr, Tc, Rh, Cd, In, Sn, Ta, Re, Tl and Pb.

13. The electrolytic solution according to claim 1, wherein the heteropolyacid and/or the heteropolyacid compound includes:
a heteroatom selected from the element group (c) consisting of B, Al, Si, P, Cr, Mn, Fe, Co, Ni, Cu, Zn, Ge and As; or
a heteroatom selected from the element group (c), where a part of the heteroatom is substituted with at least one element selected from element group (d) consisting of H, Be, B, C, Na, Al, Si, P, S, Ti, V, Cr, Mn, Fe, Co, Ni, Cu, Zn, Ga, Ge, As, Se, Zr, Rh, Sn, Sb, Te, I, Re, Pt, Bi, Ce, Th, U and Np.

14. A battery comprising:
a positive electrode;
a negative electrode; and
an electrolytic solution including an electrolyte salt and a nonaqueous solvent, wherein the nonaqueous solvent includes
a heteropolyacid and/or a heteropolyacid compound mixed within the nonaqueous solvent, where the heteropolyacid is a condensate of two or more kinds of an oxoacid, and
a monofluorophosphate and/or a difluorophosphate mixed within the nonaqueous solvent and contained in a ratio of 10-5,000 ppm in the electrolyte solution,
wherein the heteropolyacid and/or the heteropolyacid compound is a compound represented by the following formula (1)

$$A_x[BD_{12}O_{40}] \cdot yH_2O \quad (1)$$

wherein A represents Li, Na, K, Rb, Cs, Mg, Ca, Al, $NH_4$, a quaternary ammonium salt or a phosphonium salt; B represents P, Si, As or Ge; D represents at least one element selected from the group consisting of Ti, V, Cr, Mn, Fe, Co, Ni, Cu, Zn, Ga, Zr, Nb, Mo, Tc, Rh, Cd, In, Sn, Ta, W, Re and Tl; and x and y are values falling within the ranges of ($0 \le x \le 7$) and ($0 \le y \le 50$), respectively, and wherein the heteropolyacid or heteropolyacid compound has a structure selected from the group consisting of a Keggin structure, an Anderson structure and a Dawson structure, and has a structure in which a heteropolyacid ion thereof is soluble in the solvent.

15. The battery according to claim 14, wherein
a content of the heteropolyacid and/or the heteropolyacid compound is 0.01% by mass or more and not more than 3% by mass.

16. The battery according to claim 14, wherein
a cation constituting the monofluorophosphate and/or the difluorophosphate is a lithium cation, a magnesium cation or an ammonium cation.

17. The battery according to claim 14, wherein
the solvent contains at least one member of compounds selected from the group consisting of unsaturated cyclic carbonates and halogenated cyclic carbonates.

18. The battery according to claim 17, wherein the halogenated cyclic carbonate includes at least one of 4-fluoro-1,3-dioxolan-2-one, 4-chloro-1,3-dioxolan-2-one, 4,5-difluoro-1,3-dioxolan-2-one, tetrafluoro-1,3-dioxolan-2-one, 4-chloro-5-fluoro-1,3-dioxolan-2-one, 4,5-dichloro-1,3-dioxolan-2-one, tetrachloro-1,3-dioxolan-2-one, 4,5-bistrifluoromethyl-1,3-dioxolan-2-one, 4-trifluoromethyl-1,3-dioxolan-2-one, 4,5-difluoro-4,5-dimethyl-1,3-dioxolan-2-one, 4,4-difluoro-5-methyl-1,3-dioxolan-2-one, 4-ethyl-5,5-difluoro-1,3-dioxolan-2-one, 4-fluoro-5-trifluoromethyl-1,3-dioxolan-2-one, 4-methyl-5-trifluoromethyl-1,3-dioxolan-2-one, 4-fluoro-4,5-dimethyl-1,3-dioxolan-2-one, 5-(1,1- difluoroethyl)-4,4-difluoro-1,3-dioxolan-2-one, 4,5-dichloro-4,5-dimethyl-1,3-dioxolan-2-one, 4-ethyl-5-fluoro-1,3-dioxolan-2-one, 4-ethyl-4,5-difluoro-1,3-dioxolan-2-one, 4-ethyl-4,5,5-trifluoro-1,3-dioxolan-2-one, and 4-fluoro-4-methyl-1,3-dioxolan-2-one.

19. The battery according to claim 14, wherein
the electrolyte salt contains at least one member selected from the group consisting of lithium hexafluorophosphate, lithium tetrafluoroborate, lithium perchlorate and lithium hexafluoroarsenate.

20. The battery according to claim 14, wherein the solvent includes at least one member selected from the group consisting of ethylene carbonate, propylene carbonate, dimethyl carbonate, diethyl carbonate, and ethyl methyl carbonate.

21. The battery according to claim 14, wherein the unsaturated cyclic carbonate includes at least one of vinylene carbonate based compounds, vinyl ethylene carbonate based compounds, and methylene ethylene based carbonate based compounds.

22. The battery according to claim 14, further comprising at least one of
a heteropolyacid selected from the group consisting of heteropolytungstic acids, heteropolymolybdic acids, phosphovanadomolybdic acids, phosphotungstomolybdic acids, silicovanadomolybdic acids, and silicotungstomolybdic acids, and
a heteropolyacid compound selected from the group consisting of heteropolytungstic acid compounds, heteropolymolybdic acid compounds, phosphovanadomolybdic acid compounds, phosphotungstomolybdic acid compounds, silicovanadomolybdic acid compounds, and silicotungstomolybdic acid compounds.

23. The battery according to claim 14, wherein the heteropolyacid compound has a cation selected from the group consisting of $Li^+$, $Na^+$, $K^+$, $Rb^+$, $Cs^+$, $R_4N^+$, $R_4P^+$, wherein R is H or a hydrocarbon group having not more than 10 carbon atoms.

24. The battery according to claim 14, further comprising at least one of
heteropolytungstic acid compounds including sodium silicotungstate, sodium phosphotungstate, ammonium phosphotungstate, and a silicotungstic acid tetra-tetra-n-butylphosphonium salt;
heteropolymolybdic acid compounds including sodium phosphomolybdate, ammonium phosphomolybdate, and a phosphomolybdic acid tri-tetra-n-butylammonium salt; and
a phosphotungstomolybdic acid tri-tetra-n-ammonium salt.

25. The battery according to claim 14, wherein the heteropolyacid and/or the heteropolyacid compound includes:
a polyatom selected from the element group (a) consisting of Mo, W, Nb and V; or
a polyatom selected from the element group (a), where a part of the polyatom is substituted with at least one element selected from element group (b) consisting of Ti, Cr, Mn, Fe, Co, Ni, Cu, Zn, Ga, Zr, Tc, Rh, Cd, In, Sn, Ta, Re, Tl and Pb.

26. The battery according to claim 14, wherein the heteropolyacid and/or the heteropolyacid compound includes:
a heteroatom selected from the element group (c) consisting of B, Al, Si, P, Cr, Mn, Fe, Co, Ni, Cu, Zn, Ge and As; or
a heteroatom selected from the element group (c), where a part of the heteroatom is substituted with at least one element selected from element group (d) consisting of H, Be, B, C, Na, Al, Si, P, S, Ti, V, Cr, Mn, Fe, Co, Ni, Cu, Zn, Ga, Ge, As, Se, Zr, Rh, Sn, Sb, Te, I, Re, Pt, Bi, Ce, Th, U and Np.

27. The battery according to claim 14, further comprising a polymer compound which is gelled upon absorption of the electrolytic solution.

28. The battery according to claim 14, wherein a coating in a gel form containing a compound derived from the monofluorophosphate and/or the difluorophosphate is formed on the negative electrode.

29. The battery according to claim 28, wherein the coating in the gel form is obtained from the heteropolyacid and/or the heteropolyacid compound and deposited on the negative electrode so as to have a three-dimensional network structure upon absorbing the electrolytic solution therein.

* * * * *